(12) United States Patent
Ahmed et al.

(10) Patent No.: US 8,956,460 B2
(45) Date of Patent: Feb. 17, 2015

(54) PROCESS FOR RECOVERY OF VALUES FROM A FERMENTATION MASS OBTAINED IN PRODUCING ETHANOL AND PRODUCTS THEREOF

(75) Inventors: Aziz Ahmed, Chesterfield, MO (US); Quang A. Nguyen, Chesterfield, MO (US)

(73) Assignee: Abengoa Bioenergy New Technologies, LLC, Chesterfield, MO (US)

( * ) Notice: Subject to any disclaimer, the term of this patent is extended or adjusted under 35 U.S.C. 154(b) by 229 days.

(21) Appl. No.: 13/100,839

(22) Filed: May 4, 2011

(65) Prior Publication Data

US 2011/0271875 A1    Nov. 10, 2011

Related U.S. Application Data

(60) Provisional application No. 61/332,542, filed on May 7, 2010.

(51) Int. Cl.
*B01D 3/00* (2006.01)
*B01D 17/00* (2006.01)
(Continued)

(52) U.S. Cl.
CPC .. *C07G 1/00* (2013.01); *Y02E 50/17* (2013.01)
USPC ............. 127/37; 127/53; 127/55; 127/57; 203/39; 210/632; 210/702; 210/770; 210/774; 210/806; 435/161; 435/165

(58) Field of Classification Search
CPC ........ B01D 17/00; B01D 43/00; B01D 3/001; B01D 3/002; B01D 11/00; B01D 11/02; B01D 11/0288; B01D 11/0492; B01D 17/08; B01D 17/10; B01D 29/01; B01D 29/03; B01D 29/05; B01D 29/39; B01D 36/00; B01D 37/00; B01D 39/10; B01D 39/12; C02F 1/025; C02F 2103/36; C12P 2201/00; C12P 2203/00; C12M 45/00; C12M 45/06; C12M 45/09; Y02E 50/10; Y02E 50/16; Y02E 50/17; C08B 30/00; C08B 30/02; C08B 30/04; B03B 1/00; B03B 1/04

USPC ........ 210/632, 634, 770, 774, 805, 806, 639, 210/702, 709, 724, 726, 743, 767; 159/47.1; 203/39, 43, 47, 98; 127/30, 127/46.1, 53, 55, 57, 36, 37; 426/61, 429, 426/489, 658; 435/61, 136, 159–165; 568/913, 916; 209/1, 11, 12.1, 155, 209/208; 162/100, 158, 163, 181.1

See application file for complete search history.

(56) References Cited

U.S. PATENT DOCUMENTS 2,263,608 A    11/1941   Brown
2,541,058 A    2/1951   Heritage et al.
(Continued)

FOREIGN PATENT DOCUMENTS

CA    1322366 A    9/1993
WO    9213849 A1    8/1992
(Continued)

OTHER PUBLICATIONS

Ahmed, A., "Cornstalk as a Source of Fiber and Energy," 2006, Proceedings of 3rd International Symposium on Emerging Technology of Pulping and Papermaking; Nov. 8-10, 2006; Guangzhou, China: South China University of Technology Press: (New Technologies in Non-wood Fiber Pulping and Papermaking; Huaiyu, Zhan; Fangeng, Chen; Shiyu, Fu, eds.;) 1-4.

(Continued)

*Primary Examiner* — Joseph Drodge
(74) *Attorney, Agent, or Firm* — Armstrong Teasdale LLP

(57) ABSTRACT

The present invention generally relates to processes for recovery of values from a fermentation mass obtained in producing ethanol. Further, the present invention relates to processes for the recovery of values from an inorganic- and lignin-containing mass. The present invention also relates to processes for the recovery of a fraction having enhanced silica content from a silica-containing mass. Still further, the present invention relates to processes for the recovery of crude ethanol from a fermentation mass. The present invention relates to various lignin-containing products and solutions and mineral-rich products.

19 Claims, 3 Drawing Sheets

(51) Int. Cl.
*B01D 37/00* (2006.01)
*C08B 30/02* (2006.01)
*C08B 30/04* (2006.01)
*C07G 1/00* (2011.01)

(56) References Cited

U.S. PATENT DOCUMENTS

| | | | |
|---|---|---|---|
| 2,541,059 A | 2/1951 | Heritage et al. | |
| 2,541,127 A | 2/1951 | Van Beckum | |
| 2,595,827 A | 5/1952 | Boruff et al. | |
| 2,615,883 A | 10/1952 | Sweeney et al. | |
| 2,697,703 A | 12/1954 | Heritage et al. | |
| 3,017,404 A | 1/1962 | Ball | |
| 3,223,697 A | 12/1965 | Ball et al. | |
| 3,572,593 A | 3/1971 | Guarisco | |
| 3,817,826 A | 6/1974 | Hoye | |
| 3,964,880 A | 6/1976 | Siegrist | |
| 4,136,207 A | 1/1979 | Bender | |
| 4,306,999 A * | 12/1981 | Adams et al. | 524/735 |
| 4,341,353 A | 7/1982 | Hamilton et al. | |
| 4,376,163 A | 3/1983 | Ehnstrom | |
| 4,450,106 A * | 5/1984 | Forss | 530/500 |
| 4,461,648 A | 7/1984 | Foody | |
| 4,470,851 A | 9/1984 | Paszner et al. | |
| 4,511,433 A | 4/1985 | Tournier et al. | |
| 4,584,057 A | 4/1986 | Rowe et al. | |
| 4,670,944 A | 6/1987 | Thrash | |
| 4,764,596 A | 8/1988 | Lora et al. | |
| 4,966,650 A | 10/1990 | DeLong et al. | |
| 5,047,332 A | 9/1991 | Chahal | |
| 5,135,861 A | 8/1992 | Pavilon | |
| 5,348,871 A | 9/1994 | Scott et al. | |
| 5,411,594 A | 5/1995 | Brelsford | |
| 5,424,417 A | 6/1995 | Torget et al. | |
| 5,503,996 A | 4/1996 | Torget et al. | |
| 5,597,714 A | 1/1997 | Farone et al. | |
| 5,677,154 A | 10/1997 | Van Draanen et al. | |
| 5,705,369 A | 1/1998 | Torget et al. | |
| 5,733,758 A | 3/1998 | Nguyen | |
| 5,735,916 A | 4/1998 | Lucas et al. | |
| 5,777,086 A | 7/1998 | Klyosov et al. | |
| 6,228,177 B1 | 5/2001 | Torget | |
| 6,402,887 B1 | 6/2002 | Akhtar et al. | |
| 6,423,145 B1 | 7/2002 | Nguyen et al. | |
| 6,660,506 B2 | 12/2003 | Nguyen et al. | |
| 7,445,691 B2 | 11/2008 | Snekkenes et al. | |
| 7,494,675 B2 | 2/2009 | Abbas et al. | |
| 7,611,634 B2 * | 11/2009 | Futselaar et al. | 210/741 |
| 8,192,968 B2 * | 6/2012 | Edwards et al. | 435/158 |
| 8,227,221 B2 * | 7/2012 | Soong et al. | 435/161 |
| 8,236,977 B2 * | 8/2012 | Woods et al. | 554/8 |
| 8,445,563 B2 * | 5/2013 | Winterowd et al. | 524/13 |
| 8,722,878 B2 * | 5/2014 | Raines et al. | 536/124 |
| 2002/0003032 A1 | 1/2002 | Nay et al. | |
| 2002/0084045 A1 * | 7/2002 | Collias et al. | 162/16 |
| 2004/0121436 A1 * | 6/2004 | Blount | 435/161 |
| 2004/0231811 A1 | 11/2004 | Engstrand et al. | |
| 2006/0088922 A1 | 4/2006 | Yang et al. | |
| 2006/0169430 A1 | 8/2006 | Tarasenko | |
| 2006/0233864 A1 | 10/2006 | Power | |
| 2007/0209974 A1 | 9/2007 | Lees | |
| 2007/0215300 A1 | 9/2007 | Upfal et al. | |
| 2007/0227063 A1 | 10/2007 | Dale et al. | |
| 2008/0026431 A1 | 1/2008 | Saito et al. | |
| 2008/0038784 A1 | 2/2008 | D'Arnaud-Taylor | |
| 2008/0102502 A1 * | 5/2008 | Foody et al. | 435/161 |
| 2008/0299628 A1 | 12/2008 | Hallberg et al. | |
| 2008/0318291 A1 | 12/2008 | Langhauser | |
| 2009/0029432 A1 | 1/2009 | Abbas et al. | |
| 2009/0035826 A1 * | 2/2009 | Tolan et al. | 435/99 |
| 2009/0062516 A1 | 3/2009 | Belanger et al. | |
| 2009/0069550 A1 | 3/2009 | Belanger et al. | |
| 2009/0155428 A1 * | 6/2009 | Mitchell et al. | 426/103 |
| 2009/0229599 A1 * | 9/2009 | Zhang | 127/1 |
| 2009/0246848 A1 | 10/2009 | Noel | |
| 2010/0003733 A1 * | 1/2010 | Foody et al. | 435/165 |
| 2010/0041119 A1 * | 2/2010 | Christensen et al. | 435/162 |
| 2010/0159519 A1 * | 6/2010 | Diner et al. | 435/72 |
| 2010/0163018 A1 * | 7/2010 | Gifford et al. | 127/37 |
| 2010/0200182 A1 * | 8/2010 | Li | 162/16 |
| 2010/0297704 A1 * | 11/2010 | Li | 435/72 |
| 2011/0008489 A1 | 1/2011 | Robb et al. | |
| 2011/0124056 A1 * | 5/2011 | Levie et al. | 435/101 |
| 2011/0143411 A1 * | 6/2011 | Yuan et al. | 435/165 |
| 2011/0268652 A1 * | 11/2011 | Machhammer et al. | 423/648.1 |
| 2014/0154749 A1 * | 6/2014 | Medoff | 435/99 |

FOREIGN PATENT DOCUMENTS

| | | |
|---|---|---|
| WO | 9640970 A1 | 12/1996 |
| WO | 9732073 A1 | 9/1997 |
| WO | 2004106624 A1 | 12/2004 |
| WO | 2007065241 A1 | 6/2007 |
| WO | 2007111605 A1 | 10/2007 |
| WO | 2008086115 A2 | 7/2008 |
| WO | 2008144903 A1 | 12/2008 |
| WO | 2009028969 A1 | 3/2009 |
| WO | 2009089439 A1 | 7/2009 |
| WO | 2010045576 A2 | 4/2010 |
| WO | 2011028554 A1 | 3/2011 |

OTHER PUBLICATIONS

Chida, T., et al., "Dissolution Rate of Colloidal Silica in Highly Alkaline Solution," Spring 2004, Materials Research Society Symposium Proceedings, vol. 824/CC8.39:467-472.
Chida, T., et al., "Dynamic Behavior of Colloidal Silica in the Presence of Solid Phase," Fall 2002, Materials Research Society Symposium Proceedings, vol. 757/II3.17:497-502.
Cunningham, R.L., et al., "Improved Hemicellulose Recovery From Wheat Straw," 1985, Biotech & Bioeng Symp, No. 15, Seventh Symposium on Biotechnology for Fuels and Chemicals, DOE, C.D. Scott, Editor, 13 pages.
Grethlein, H.E., "Chemical Breakdown of Cellulosic Materials," 1978, J Appl Chem Biotechnol, 28:296-308.
Sharma-Shivappa, R.R., et al., "Conversion of Cotton Wastes to Bioenergy and Value-Added Products," 2008, ASABE, 51/6:2239-2246.
Sun, L., "Silicon-Based Materials from Rice Husks and Their Applications," 2001, Ind Eng Chem Res, 40/25:5861-5877 (Abstract).
Wilkie, A.C., et al., "Stillage Characterization and Anaerobic Treatment of Ethanol Stillage from Conventional and Cellulosic Feedstocks," 2000, Biomass and Bioenergy, 19:63-102.
GEA Wiegand, GmbH, Process Engineering Division, "Bioethanol Technology", Ettlingen, Germany, Company Brochure, 16 pages.
Determination of Structural Carbohydrates and Lignin in Biomass, Technical Report NREL/TP-510-42618, revised Apr. 2008, 16 pages.
Determination of of Ash in Biomass, Technical Report NREL/TP-510-42622, revised Jan. 2008, 8 pages.
Determination of Extractives in Biomass, Technical Report NREL/TP-510-42619, revised Jan. 2008, 12 pages.
Determination of Protein Content in Biomass, Technical Report NREL/TP-510-42625, revised May 2008, 8 pages.
Determination of Sugars, Byproducts, and Degradation Products in Liquid Fraction Process Samples, Technical Report NREL/TP-510-42623, revised Jan. 2008, 14 pages.
Determination of Total Solids in Biomass and Total Dissolved Solids in Liquid Process Samples, Technical Report NREL/TP-510-42621, revised Mar. 2008, 9 pages.
GEA Wiegand, GmbH, Process Engineering Division, "Distillation Technology", Ettlingen, Germany, Company Brochure, 16 pages.
Handbook of Surface and Colloidal Chemistry, Third Ed., 2009, K.S. Birdi, Editor, CRC Press, Taylor & Francis Group, Boca Raton, FL, pp. 476-486, 15 pages.
Magnesium-Alkaline Pulping of Birch, Chen, R., et al., AIChE 1989 and 1990 Forest Product Symposium, 1992, p. 41-47.
Preparation of Samples for Compositional Analysis, Laboratory Analytical Procedure (LAP), Technical Report NREL/TP-510-42620, revised Aug. 2008, 12 pages.

(56) References Cited

OTHER PUBLICATIONS

International Search Report and Written Opinion issued in PCT/US2011/035198, dated Oct. 5, 2011, 16 pages.

Abstract of CN 101310879A, Published Nov. 11, 2008, Institute of Process Engineering, Chinese Academy of Science.

Al-Halaly, A.S.M., "A Study of Some Anatomical Chemical Properties and Specific Gravity of Casuarina Equisetifolia Forst. Wood Grown in Iraq," 1985, AGRIS Record No. IQ8500239, Abstract Only, 1 page.

Antongiovanni, M., et al., "Variability in Chemical Composition of Straws," 1991, CIHEAM—Options Mediterraneenes, Serie Seminaires, 16:49-53.

Azadbakht, M., et al, "Preparation of Lignin From Wood Dust as Vanillin Source and Comparison of Different Extraction Methods," 2004, Intl J Biol and Biotech, 1/4:535-537, Abstract Only, 1 page.

Dowe, N., et al., SSF Experimental Protocols—Lignocellulosic Biomass Hydrolysis and Fermentation, Issued 2001, Revised 2008, NREL Technical Report, NREL/TP-510-42630, 19 pages.

Flint, S.I., et al., "Recovery of Lignin During Nonstarch Polysaccharide Analysis," 1992, Cereal Chem, 69/4:444-447.

Hames, B., et al., "Preparation of Samples for Compositional Analysis," Issued 2008, NREL Technical Report, NREL/TP-510-42620, 12 pages.

Kolar, L., et al., "Agrochemical Value of Organic Matter of Fermenter Wastes in Biogas Production," 2008, Plant Soil Environ, 54/8:321-328.

Pan, X., et al., "Bioconversion of Hybrid Poplar to Ethanol and Co-Products Using an Organosolv Fractionation Process: Optimization of Process Yields," 2006, Biotech Bioeng, 94/5:851-861.

Thomas, S.R., "Corn Stover Feedstock Variability," 2005, Feedstock Area Stage Gate Review Meeting, 34 pages.

Thompson, D.N., et al., "Post-Harvest Processing Methods for Reduction of Silica and Alkali Metals in Wheat Straw," 2002, 24th Symposium on Biotechnology for Fuels and Chemicals, Poster #1-30, 21 pages.

* cited by examiner

PROCESS FOR RECOVERY OF VALUES FROM A FERMENTATION MASS OBTAINED IN PRODUCING ETHANOL AND PRODUCTS THEREOF

REFERENCE TO RELATED APPLICATIONS

This application claims the benefit of U.S. provisional application Ser. No. 61/332,542, filed May 7, 2010, the entire disclosure of which is incorporated herein by reference.

GOVERNMENT LICENSE RIGHTS

This invention was made with Government support under DOE Cooperative Agreement Nos. DE-FC36-03GO13142 and DE-FC36-07GO17028. The Government has certain rights in this invention.

FIELD OF THE INVENTION

The present invention generally relates to processes for recovery of values from a fermentation mass obtained in producing ethanol. Further, the present invention relates to processes for the recovery of values from an inorganic- and lignin-containing mass. The present invention also relates to processes for the recovery of a fraction having enhanced silica content from a silica-containing mass. Still further, the present invention relates to processes for the recovery of crude ethanol from a fermentation mass. The present invention relates to various lignin-containing products and solutions and mineral-rich products.

BACKGROUND OF THE INVENTION

Worldwide energy demands together with high value of cereal grains provide strong incentives to produce ethanol from other biomass feedstocks. Ethanol has a number of uses, but is used primarily as a fuel or a fuel additive to gasoline to boost octane, reduce pollution, and/or to partially replace gasoline and reduce crude oil requirements.

Ethanol may be produced from a variety of biomass feedstocks. As used herein, biomass refers to any organic material that is renewable. For example, ethanol may be produced from a plant-based feedstock derived from an energy crop. Exemplary energy crops include corn, sugarcane, millet and so on. The fruits and/or seeds of an energy crop typically comprise a large portion of starch, which is readily fermentable into ethanol by conventional processes.

Conventional processes known in the art for producing ethanol from energy crops, such as corn, include dry mill or wet mill fermentation processes. See for example, CORN, Chemistry and Technology, Stanley A. Watson and Paul E. Ramstad, editors, 1987, Published by the American Association of Cereal Chemists, Inc., St. Paul, Minn., USA, which is incorporated herein by reference for all relevant purposes. For example, dry mill ethanol production uses the starch portion of corn kernels, which is about 70% of the kernel. The starch component is converted by hydrolysis to sugars, which are then fermented to form ethanol. The ethanol is then recovered from the fermentation mass by means known in the art.

Ethanol may also be prepared from a variety of lignocellulosic biomass materials including crop residues such as corn stover, rice straw, wheat straw, and bagasse; logging and mill residues such as wood chips, saw dust, and pulping liquor; grasses such as switchgrass; trees such as poplar and willow; and plant-derived wastes such as household garbage and paper products. Thus, lignocellulosic biomass is a readily available and relatively inexpensive substrate for the preparation of sugars, which may be fermented to produce alcohols such as ethanol.

Generally, the preparation of ethanol from lignocellulosic biomass involves (1) liberating cellulose and hemicellulose from lignin and/or increasing the accessibility of cellulose and hemicellulose to enzymatic or chemical hydrolysis, (2) depolymerizing carbohydrate sugars of hemicellulose and cellulose to free sugars, (3) fermenting the sugars to ethanol, and (4) separating the ethanol from the fermentation mass.

Regardless of the type of biomass feedstock, ethanol is typically separated from the fermentation mass by distillation. The bottoms of the distillation operation, which is referred to herein as stillage, consists primarily of protein, lignin, inorganics (e.g., $SiO_2$, $CaO$, $MgO$, $KO$, $Fe_2O_3$, $P_2O_5$, $Al_2O_3$, etc.), unreacted or partially reacted carbohydrates (e.g., cellulose or hemicellulose), and residual sugars. These values have a variety of uses. For example, when ethanol is produced from fermentation of cereal grains, such as corn, the process yields protein-containing co-products that are known in the art as Wet Distillers Grains (WDG), Dried Distillers Grains (DDG), Wet Distillers Grains Plus Solubles (WDGS), or Dried Distillers Grains plus Solubles (DDGS), which are collectively referred to herein as distiller's grain. Distiller's grains are typically used for animal feed. Furthermore, lignin, which is a complex random polyphenolic polymer, can be used as a fuel or fuel additive and can serve as a raw material for a variety of products including wood adhesives, flame retardants, slow-release agents for agricultural and pharmaceutical products, surfactants, asphalt/concrete extenders, drilling mud, and plastics. Inorganics obtained from a fermentation mass may be used in fertilizer formulations or as adsorbents or filtration media. Carbohydrates and residual sugars can be further utilized as sources of sugar in a fermentation process for the production of ethanol.

Various processes for recovering lignin and/or silica from biomass have been disclosed. For example, Lucas et al., U.S. Pat. No. 5,735,916, disclose a process for producing lignin fuel, silica/caustic oxide, cellulose, and cellulose derivatives from plant biomass. The process includes (1) milling or grinding plant biomass; (2) extracting sugar, soluble salts, soluble plant proteins, and soluble polypeptides from plant biomass at a pH between 3-5 using a mild acid solvent and sending the extract to a fermentation process; (3) filtering off the remaining solid material; (4) dissolving lignin and silica from the solid material with a caustic hydroxide solution; and (5) separating lignin from the caustic silicate solution by ultrafiltration.

Farone, U.S. Pat. No. 5,597,714, describes a process for producing sugars for various uses by concentrated acid hydrolysis of biomass and a process for removing silica or silicates from solids remaining following the acid hydrolysis of biomass. In this process, biomass is first decrystallized and then hydrolyzed with acid to convert cellulose and hemicellulose to sugars. Following hydrolysis, the sugar solution is separated, by means of a belt press, from any remaining solid materials, which include lignin. The remaining solid materials are treated with a metal hydroxide solution at a pH above 12 to extract a solution containing silicic acid. Thereafter, silica is precipitated from solution at a pH around 10 and filtered from the solution. Throughout the process lignin remains insoluble in the aqueous medium of the process. Insoluble lignin together with other residual solid materials are recovered by belt press for use as a wet lignin fuel.

While these processes may improve on the economics of a process for the preparation of ethanol from biomass by recovering or removing values from a pretreated biomass feedstock, there remains opportunity for further improvement by recovering values from a fermentation mass, such as stillage, obtained in producing ethanol. Moreover, the need exists for a process that recovers and fully utilizes carbohydrates, lignin, inorganics, and residual sugars obtained from a fermentation mass that can be practiced on a commercial scale to further improve economics of a process for the preparation of ethanol from biomass feedstocks.

SUMMARY OF THE INVENTION

Briefly, therefore, the present invention is directed to processes for recovery of values from a fermentation mass obtained in producing ethanol. In accordance with one embodiment, the process comprises classifying the solids component of a fermentation mass to recover a solids fraction enriched in carbohydrates relative to the carbohydrate content of the solids component of the fermentation mass and a crude aqueous lignin slurry fraction comprising a solids component enriched in lignin relative to the lignin content of the solids fraction enriched in carbohydrates.

The present invention is further directed to processes for the recovery of values from an inorganic- and lignin-containing mass. In one embodiment, the process comprises (a) contacting the inorganic- and lignin-containing mass with an alkali in an aqueous medium having a pH from about 11.5 to about 13 and dissolving lignin contained in the mass in the aqueous medium, thereby producing an aqueous alkaline extract fraction comprising dissolved lignin; (b) reducing the pH of the aqueous alkaline extract fraction comprising dissolved lignin to between about 7 and about 11 and precipitating inorganic solids from the aqueous alkaline extract fraction, thereby producing a slurry comprising particulate inorganic solids and dissolved lignin; (c) subjecting the slurry comprising particulate inorganic solids and dissolved lignin to a solid-liquid separation to separate the particulate inorganic solids, from the slurry, thereby producing a mineral-rich particulate solids fraction comprising inorganic solids and a lignin-rich aqueous fraction comprising dissolved lignin; and (d) contacting the lignin-rich aqueous fraction comprising dissolved lignin with an acidifying agent in sufficient proportion to reduce the pH of the aqueous fraction to a value at which the lignin precipitates, thereby producing a slurry comprising precipitated lignin.

The present invention also relates to processes for the recovery of a solids fraction having enhanced silica content from a silica-containing mass. In one embodiment, the process provides for the recovery of silica from a slurry comprising an alkaline aqueous phase comprising particulate inorganic solids and dissolved lignin. The process comprises (a) centrifuging the slurry in a first centrifugation stage to separate a lignin-rich aqueous fraction comprising dissolved lignin from a mineral-rich particulate solids fraction comprising particles enriched in silica; and (b) centrifuging the mineral-rich particulate solids fraction or an aqueous dilution thereof in a second centrifugation stage to produce a silica-rich solids fraction and a silica-poor fraction.

Still further, the present invention relates to processes for the recovery of crude ethanol from a fermentation mass. In one embodiment, the process comprises subjecting the fermentation mass comprising ethanol to a solid-liquid separation, thereby separating a liquid fraction comprising ethanol from a fermentation solids fraction comprising the solids component of the fermentation mass.

The present invention relates to various novel products and solutions including (i) a particulate solids product, which contains lignin, (ii) a lignin-rich aqueous solution, (iii) a mineral-rich particulate solids product, (iv) a lignin-rich solids product, and (v) a concentrated lignin-rich aqueous solution.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
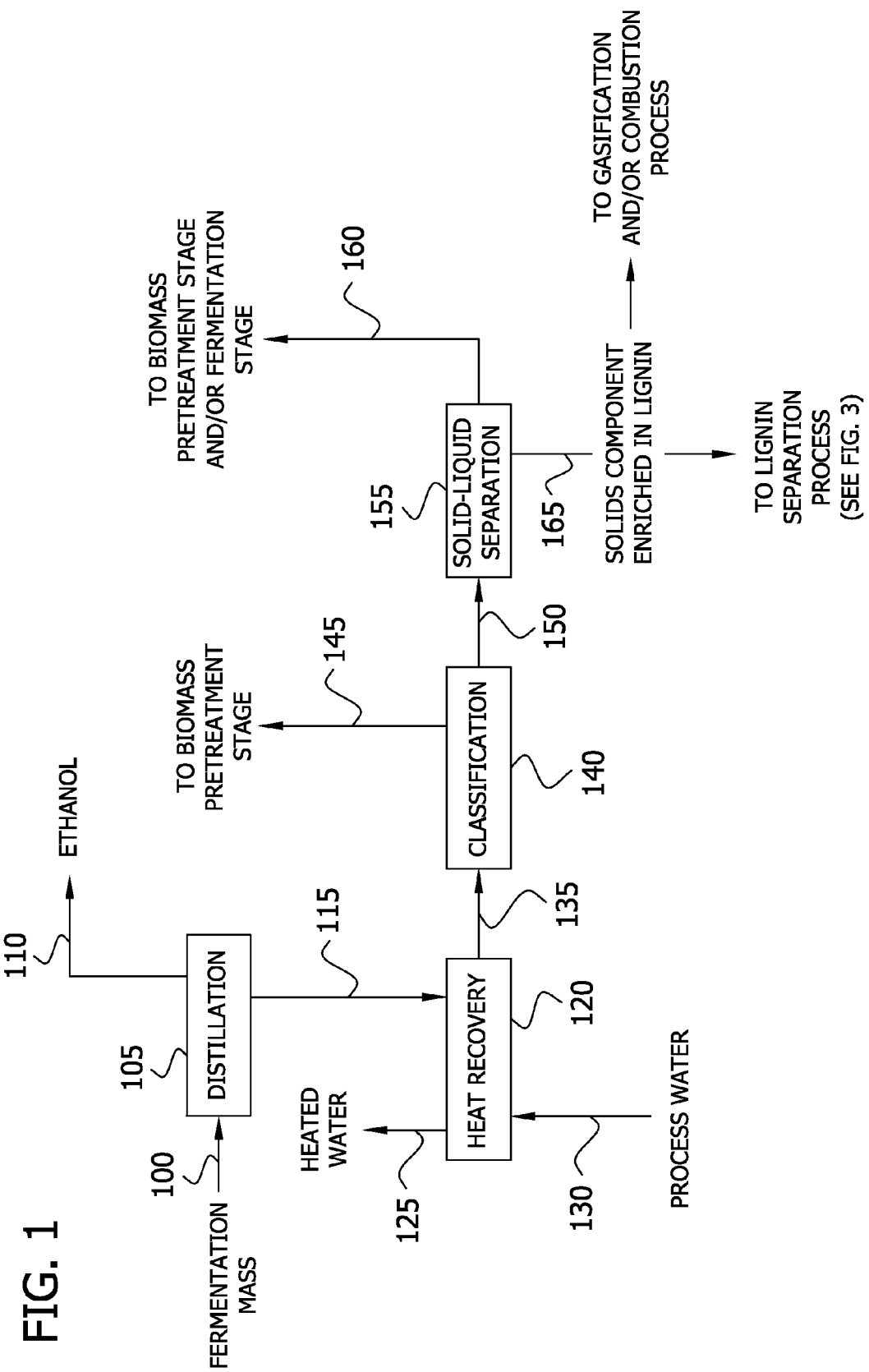
FIG. 1 depicts a process flow of one embodiment of a lignin and/or carbohydrate recovery process which includes classifying the solids component of stillage.

The present invention is directed to a process for recovery of values from a fermentation mass obtained in producing ethanol. The present invention is particularly effective for the recovery of carbohydrates, lignin, inorganics, and residual sugars from a fermentation mass, which advantageously provides for enhanced utilization of the fermentation mass.

In one aspect, the present invention provides for recovery of carbohydrates from a fermentation mass. Unexpectedly, it has been discovered that classification of the solids component of a fermentation mass yields at least one fraction enriched in carbohydrates. The solids fraction enriched in carbohydrates can be recycled back to a biomass pretreatment step wherein hemicellulose and cellulose are depolymerized to free sugars for fermenting in a process for the production of ethanol. Recovery and recycle of a solids fraction enriched in carbohydrates advantageously prevents the loss of valuable carbohydrates to landfilling or incineration and increases ethanol yields in the preparation of ethanol from lignocellulosic biomass.

In another aspect, the present invention provides for the recovery of soluble sugars from a fermentation mass. According to the present invention, the classification of the solids component of the fermentation mass comprises introducing a slurry comprising the entire fermentation mass or a portion thereof to a screen separation system comprising a screen or a series of screens. The liquid fraction containing soluble sugars that passes through the classifying screen or screens and any further solid-liquid separation can be collected and recycled to a biomass pretreatment stage and/or to a fermentation stage in a process for the production of ethanol as described elsewhere herein. Recovery and recycle of soluble sugars advantageously prevents the loss of valuable sugars.

In yet another aspect, the present invention is directed to a recovery process which includes classifying the solids component of a fermentation mass to recover at least one solids fraction enriched in carbohydrates and a crude aqueous lignin slurry fraction comprising a solids component enriched in lignin. Lignin and inorganics contained in the latter fraction may be used as an additive in concrete formulation.

In another aspect, the present invention provides for a process of dissolving and maintaining the solubility of lignin in alkaline solution while allowing recovery of inorganics from solution via precipitation, and thereafter optionally providing for the recovery of lignin via precipitation. Precipitated inorganics may be used in fertilizer formulations or as adsorbents or filtration media. Lignin dissolved in alkaline solution can be concentrated and formulated to produce adhesive for use in, for example, particle board, medium density fiber board (MDF), plywood, and oriented strand board (OSB). If precipitated, a lignin-rich solids product can be recovered and used as a fuel or fuel additive and can serve as a raw material for a variety of products including flame retardants, slow-release agents for agricultural and pharmaceutical products, surfactants, asphalt/concrete extenders, drilling mud, and plastics. These products, which would otherwise be landfilled or incinerated, improve overall process economics for the production of ethanol from lignocellulosic biomass.

In another aspect, the present invention provides for a recovery process which includes classifying the solids component of a fermentation mass to produce at least one solids fraction enriched in carbohydrates. Lignin is taken up in an aqueous liquid phase from which it may be recovered by solvent extraction.

In another aspect, the present invention provides for a process for recovery of a silica-rich fraction from a slurry comprising an alkaline aqueous phase comprising dissolved lignin and a particulate solid phase comprising particles enriched in silica. The fraction having enhanced silica content may be used or as adsorbent or filtration media.

In yet another aspect, the present invention is directed to a process for the recovery of crude ethanol from a fermentation mass that has not been subjected to distillation. This process reduces heat requirements, increases capacity, and reduces maintenance for downstream distillation operations used for the further recovery of ethanol.

The present invention also provides for useful lignin-containing products and solutions and mineral-rich products.

I. Feedstock

In accordance with the present invention, a fermentation mass is obtained from a process for the production of ethanol from a biomass feedstock. Biomass feedstocks include, for example, energy crops, plant biomass, agricultural wastes, forestry residues, sugar processing residues and plant-derived household wastes. Biomass feedstocks containing relatively high amounts of inorganics, such as silica, are generally suitable for the process of the present invention (e.g., agricultural wastes, energy crops, and non-woody plant biomass). However, biomass feedstocks containing relatively low concentrations of inorganics may also be used (e.g., woody biomass feedstocks). In particular, the feedstock may comprise corn, sugarcane, millet, maize, oats, grain sorghum, milo, wheat, barley, triticale, rice, rye, buckwheat, white sweet-clover, or combinations thereof. In various embodiments, the feedstock comprises corn grain. Further, the feedstock may comprise grasses, such as switchgrass, cord grass, rye grass, reed canary grass, miscanthus, or combinations thereof. Additionally or alternatively, the feedstock may include agricultural wastes and/or cereal straws such as rice straw, rice hulls, barley straw, corn cobs, wheat straw, canola straw, oat straw, oat hulls, corn fiber, stover (e.g., sorghum, soybean stover and/or corn stover), or combinations thereof. In various preferred embodiments, the feedstock is selected from the group consisting of corn stover, cereal straw, switchgrass and mixtures thereof. The feedstock may also include wood and forestry wastes such as recycled wood pulp fiber, sawdust, hardwood, softwood, forest thinnings, orchard thinnings, or combinations thereof. Suitable sugar-processing residues include, for example, sugarcane bagasse, sweet sorghum, beet pulp, or combinations thereof. The feedstock may also include plant-derived household wastes such as garbage and paper products.

Generally, lignocellulosic biomass contains from about 35 wt. % to about 50 wt. % cellulose, from about 20 wt. % to about 30 wt. % hemicellulose, from about 15 wt. % to about 30 wt. % lignin, from about 2 wt. % to about 5 wt. % extractives, and from about 2 wt. % to 10 wt. % inorganics in the form of ash. For example, corn stover typically has a cellulose content from about 33 wt. % to about 40 wt. %, a hemicellulose content from about 20 wt. % to about 28 wt. %, and a lignin content from about 16 wt. % to about 22 wt. %. Corn stover also typically contains a minor portion of ash (e.g., from about 3 wt. % to about 10 wt. %, or from about 4 wt. % to about 8 wt. %). By way of further example, switchgrass typically has a cellulose content from about 30 wt. % to about 38 wt. %, a hemicellulose content from about 22 wt. % to about 30 wt. %, and a lignin content from about 16 wt. % to about 22 wt. %. Switchgrass also typically contains a minor portion of ash (e.g., from about 3 wt. % to about 8 wt. %, or from about 4 wt. % to about 6 wt. %). The variation in content of these components primarily depends on the type of biomass and the geographical location where the biomass is grown. The precise properties of the biomass feedstock are not narrowly critical.

II. Production of Ethanol from Biomass

Conventional processes for the production of ethanol from biomass feedstocks generally comprise the following: (a) a comminution stage, (b) a biomass pretreatment stage, (c) a fermentation stage, and (d) an ethanol recovery stage.

In a comminution stage, milling or grinding of biomass feedstock proceeds in accordance with conventional methods known in the art (e.g., hammer milling). Generally, comminuted biomass feedstock contains particles of a size in their largest dimension of less than about 6 cm (about 2.5 inches), less than about 5 cm (about 2 inches), less than about 4 cm (about 1.5 inches), or less than about 2.5 cm (about 1 inch). Typically, the feedstock contains particles of a size from about 0.01 cm (about 0.004 inches) to about 6 cm (about 2.4 inches), from about 0.1 cm (about 0.04 inches) to about 5 cm (about 2 inches), or from about 0.5 cm (about 0.2 inches) to about 4 cm (about 1.5 inches).

Similarly, the particles of the comminuted feedstock may be described by various particle size parameters. For example, comminuted feedstock comprises particles of a size distribution such that no more than about 40 wt. %, no more than about 30 wt. %, or no more than about 20 wt. % of the feedstock particles are retained by a U.S. Sieve No. 10 (2000 μm) screen. Additionally or alternatively, comminuted feedstock suitable for use in the processes of the present invention may comprise particles of a size distribution such that at least about 60 wt. %, at least about 70 wt. %, or at least about 80 wt. % of the feedstock particles are retained by a U.S. Sieve No. 60 (250 μm) screen.

While not narrowly critical for the present invention, the particle size of biomass feedstock may impact the biomass pretreatment and/or fermentation stages. For example, during the biomass pretreatment stage, as detailed elsewhere herein, a significant portion of relatively large particles may reduce accessibility of cellulose and hemicellulose to enzymatic or acid hydrolysis. A significant portion or fraction of relatively fine feedstock particles may also be undesired due to their impact on processing of the feedstock. For example, relatively fine particles may be lost during filtration and washing of feedstock particles, representing a loss in cellulose and/or hemicellulose.

Moreover, the biomass feedstock may be subjected to a cleaning operation prior to or after milling or grinding to further remove various impurities and contaminants (e.g., rock, dirt, sand, and like materials). Cleaning of the biomass feedstock proceeds generally as known in the art, for example, by processes including operations such as water washing, air classification, magnetic separation (for removing ferrous materials), and/or screen separation (e.g., a vibratory screen separation system).

After comminution, biomass is typically introduced to a biomass pretreatment stage. Generally, in a biomass pretreatment stage the cellulose-hemicellulose-lignin complex in the biomass feedstock is broken down and the carbohydrate sugars of hemicellulose and cellulose are depolymerized to free fermentable sugars. Pretreatment generally proceeds according to methods known in the art. For example, pretreatment may include a first step of treating the biomass feedstock by a method employing steam explosion, acid-catalyzed steam explosion, organosolv, and/or dilute acid (e.g., sulfuric or nitric acid) followed by a second step that includes hydrolysis of cellulose to glucose (e.g., enzymatic hydrolysis or acid hydrolysis). The biomass pretreatment stage may also include high temperature digestion to hydrolyze hemicellulose into soluble xylose prior to hydrolysis of cellulose to glucose. Xylose can be separated by washing from the remaining cellulosic materials. As referred to herein, a biomass pretreatment stage also includes operations known in the art such as conditioning (e.g., to remove components that may inhibit fermentation of sugars) and dilution (e.g., to prepare the pretreated biomass stream for introduction to a fermentation stage).

Following pretreatment, the treated biomass materials are introduced to a fermentation stage. In a fermentation stage, glucose and other sugars are fermented to ethanol using a suitable fermentation organism, such as yeast, according to methods known in the art. Similarly, xylose may also be fermented to ethanol using a suitable fermentation organism according to methods known in the art. If separated from cellulosic materials, xylose may be fermented in a separate operation. Optionally, enzymatic hydrolysis of cellulose in the pretreatment stage and the fermentation stage may be combined in a single stage (i.e., simultaneous saccharification and fermentation) wherein hydrolysis is conducted simultaneously with fermentation. As referred to herein, a fermentation stage also includes any propagation operations (e.g., yeast propagation).

Following the fermentation stage, a fermentation mass containing ethanol is introduced to an ethanol recovery stage. During an ethanol recovery stage, the fermentation mass is typically introduced into a distillation operation wherein a fraction comprising ethanol is recovered in an overhead stream and residual materials (i.e., stillage) are recovered in a bottoms stream. Distillation generally proceeds in accordance with conventional methods known in the art using conventional apparatus as described, for example, in Distillation Technology, GEA Wiegand, 16 pages and Bioethanol Technology, GEA Wiegand, 16 pages, which are incorporated herein by reference for all relevant purposes. The fraction comprising ethanol may then be further dehydrated (e.g., via molecular sieve) to produce an ethanol product.

III. Classification of Stillage and/or a Fermentation Mass

FIG. 1 depicts an embodiment of a process of the present invention and, in particular, describes a recovery process which includes classifying the solids component of a fermentation mass, which has been subjected to distillation for recovery of ethanol (i.e., stillage), to produce fractions enriched in carbohydrates and lignin. The residual solids and residual liquids retained in the bottoms of a distillation operation are collectively referred to herein as stillage. The following processes described herein may be practiced on a batch, semi-batch or continuous basis.

Now referring to FIG. 1, a fermentation mass 100 obtained in producing ethanol is introduced to a distillation stage 105 wherein a fraction comprising ethanol is recovered in overhead stream 110 and stillage is recovered in bottoms stream 115.

Stillage exiting the distillation stage is typically an aqueous solution having the solids component of the fermentation mass suspended therein. In various embodiments, stillage comprises an aqueous slurry containing from about 5 wt. % to about 20 wt. % solids, more preferably from about 5 wt. % to about 15 wt. % solids, and even more preferably from about 10 wt. % to about 15 wt. % solids. Stillage typically contains lignin, protein, inorganics (e.g., $SiO_2$, $CaO$, $MgO$, $KO$, $Fe_2O_3$, $P_2O_5$, $Al_2O_3$, etc.), unreacted or partially reacted carbohydrates, residual sugars, and water. The temperature of stillage exiting the distillation stage typically ranges from ambient temperature to about 90° C. In various embodiments, stillage exiting the distillation stage may be sent to storage tanks for later utilization in a process according to the present invention.

Again, referring to FIG. 1, stillage 115 may be received directly from the bottoms of the distillation stage and/or from one or more storage tanks (not shown on FIG. 1) and may be introduced to optional heat recovery stage 120 to the reduce the temperature of the stillage to preferably between about 50° C. and about 75° C. and more preferably between about 50° C. and about 70° C. The medium heated in the heat recovery stage typically includes process water 130.

Stillage 135 from one or more storage tanks, bottoms of the distillation stage, and/or from heat recovery stage 120 is introduced into classification stage 140. Stillage is typically introduced to the classification stage as an aqueous slurry containing from about 5 wt. % to about 20 wt. % solids, more preferably from about 5 wt. % to about 15 wt. % solids, and even more preferably from about 10 wt. % to about 15 wt. % solids. In classification stage 140, the solids component of stillage is classified into two or more fractions. In various embodiments, the solids component obtained from distiller's grain (e.g., Wet Distillers Grains (WDG), Dried Distillers Grains (DDG), Wet Distillers Grains Plus Solubles (WDGS), or Dried Distillers Grains plus Solubles (DDGS)) are classified to provide two or more solids fractions of differing particle size.

In accordance with the present invention, classification of the solids component of stillage provides for recovery of a solids fraction enriched in carbohydrates relative to the carbohydrate content of the solids component of the stillage and a crude aqueous lignin slurry fraction comprising a solids component enriched in lignin relative to the lignin content of the solids fraction enriched in carbohydrates. In various embodiments of the present invention, classification of the solids component of stillage provides for recovery of a solids fraction enriched in carbohydrates relative to the carbohydrate content of the solids component of the stillage and a crude aqueous lignin slurry fraction comprising a solids component enriched in lignin relative to the lignin content of the solids component of the stillage.

As used herein, the terms "classified," "classifying," or "classification" refers to any operation that is capable of separating the solids component into two or more fractions having different particle size ranges. Several classification techniques are known in the art and may be used in accordance with the present. For example, classifications techniques include screen separation, filtration, and sedimentation techniques or by means of a hydroclone classifier.

In various embodiments, classification comprises separation of the solids component by a screen separation system comprising a screen or a series of two or more screens having openings progressively decreasing in size. Various types of screens may be used in the screen classification system including, for example, woven wire screens and/or wedge wire screens.

In a screen separation system, a slurry comprising stillage or a stillage concentrate is directed to the screen or the first in a series, wherein the largest particles are collected on the first screen in a series, and solids fractions of progressively smaller particle size are collected on successive screens of the series, and a liquid fraction comprising soluble sugars and typically suspended fines exit the last screen. Typically, when a screen separation system is used, the screen or screens of that system are positioned at an appropriate angle (e.g., 45°) such that the fraction retained thereon traverses the upper side of the screen by gravity or other means (e.g., vibration) to an exit located at the lowest point or region of the screen, which leads to a solids handling system. The solids fraction enriched in carbohydrates, as referred to herein, is the material exiting the screen. The solids handling system transports a fraction exiting a classification screen to a subsequent process step. Solids handling systems may include, for example, a screw conveyor. It should be understood that solids handling systems, such as a screw conveyor, may further reduce the water content of a fraction during conveyance.

Accordingly, when a screen separation system is used, the solids fraction enriched in carbohydrates is retained on at least one screen. Further, where a slurry comprises stillage or concentrate thereof is introduced to the at least one screen, a crude aqueous lignin slurry fraction comprising a solids component enriched in lignin passes through the at least one screen. In various embodiments, a process according to the present invention comprises introducing stillage to a screen separation system comprising a screen sized for removal of a coarse particulate comprising the solids fraction enriched in carbohydrates, passing the liquid phase through the screen while retaining the coarse particulate on the screen, removing the crude aqueous lignin slurry from the screen separation system, the crude aqueous lignin slurry fraction comprising a solids component enriched in lignin. In these embodiments, the crude aqueous lignin slurry fraction may be subjected to further solid-liquid separation, thereby separating the solids component enriched in lignin from a liquid fraction.

In various preferred embodiments, the screen separation system includes one screen. Typically, the screen has openings of about 150 µm to about 210 µm (e.g., a mesh size from about U.S. Sieve No. 100 (150 µm) to about U.S. Sieve No. 70 (210 µm)). Therefore, in various embodiments, the particle size of the fraction enriched in carbohydrates is such that the fraction is retained on a screen having openings of about 150 µm to about 210 µm and the particle size of the solids component enriched in lignin of the crude aqueous lignin slurry fraction is such that the fraction passes through the screen having openings of about 150 µm to about 210 µm. In these and other embodiments, the particle size of the fraction enriched in carbohydrates is such that the fraction is retained on a screen having a mesh size from about U.S. Sieve No. 100 (150 µm) to about U.S. Sieve No. 70 (210 µm) and the particle size of the solids component enriched in lignin of the crude aqueous lignin slurry fraction is such that the fraction passes through the screen having a mesh size from about U.S. Sieve No. 100 (150 µm) to about U.S. Sieve No. 70 (210 µm).

In various other embodiments, the screening separation system includes two screens. Typically, the first screen has openings of about 210 µm (e.g., a mesh size of about U.S. Sieve No. 70 (210 µm)) and the second screen has openings of about 150 µm (e.g., a mesh size of about U.S. Sieve No. 100 (150 µm)). The particle size of the solids fraction enriched in carbohydrates is such that the solids fraction is retained on the first screen and the particle size of the solids component enriched in lignin of the crude aqueous lignin slurry fraction is such that the fraction passes through the first and second screen. An intermediate fraction that passes through the first screen but is retained on the second screen (e.g., −70/+100 fraction) is typically enriched in inorganics. The intermediate fraction enriched in inorganics may be used in drilling mud and/or concrete formulations.

In another embodiment, classification comprises introducing stillage to the first of a series of classifying screens comprising successive screens having openings of progressively decreasing size and causing the liquid phase to pass through the entire series of screens, thereby recovering: (a) a coarse particulate comprising the solids fraction enriched in carbohydrates on the first of the series of screens, (b) an intermediate particulate comprising a solids fraction enriched in inorganics, and (c) one or more progressively finer particulates comprising the solids fractions enriched in lignin on successive screens downstream of the first screen with respect to the direction of liquid flow, and providing a liquid fraction exiting the last of the screens. In various embodiments, the series of screens includes screens having openings of about 210 µm (e.g., a mesh size of about U.S. Sieve No. 70 (210 µm)) and about 150 µm (e.g., a mesh size of about U.S. Sieve No. 100 (150 µm). In these and various other embodiments, the intermediate particulate comprising the solids fraction enriched in inorganics passes through a screen having openings of about 210 µm but is retained on a screen having openings of about 150 µm. Further, in these and other embodiments, the intermediate particulate comprising the solids fraction enriched in inorganics passes through a screen having a mesh size of about U.S. Sieve No. 70 (210 µm) but is retained on a screen having a mesh size of about U.S. Sieve No. 100 screen (150 µm). In various embodiments, the last in the series of screens has a pore size from about 45 to about 100 microns (µm). In other embodiments, the last in the series of screens has a pore size no larger than about 45 microns.

Again referring to FIG. 1, the fraction enriched in carbohydrates 145 exiting the classification stage may be recycled back to a biomass pretreatment stage in a process for the production of ethanol as previously describe elsewhere herein.

The crude aqueous lignin slurry fraction 150 comprising a solids component enriched in lignin exiting the classification stage may also comprise soluble sugars and soluble and insoluble inorganics. The crude aqueous lignin slurry fraction 150 is introduced into a solid-liquid separation stage 155. In this stage, a solids component enriched in lignin 165 is separated from a liquid fraction containing soluble sugars 160 (i.e., thin stillage).

The solids component enriched in lignin may be separated from the liquid fraction in accordance with means known in the art including, for example, filtration, centrifugation, or combinations thereof. In various preferred embodiments, solid-liquid separation stage 155 includes one or more centrifuges and more preferably one or more decanter centrifuges. In other embodiments the solid-liquid separation stage 155 includes a filtration system. Typically, the filtration media used has a nominal pore size from about 8 to about 25 microns (µm). In various embodiments, the filtration media has a nominal pore size of about 8 microns. In other embodiments, solid-liquid separation stage 155 comprises a combination of centrifugation and filtration techniques.

Generally, the liquid fraction contains soluble sugars comprising pentoses (e.g., xylose) and hexoses (e.g., glucose). Typically, the sugars contained in the liquid fraction 160 comprise from about 60 wt. % to about 80 wt. % pentoses and from about 20 wt. % to about 40 wt. % hexoses. In various embodiments, a liquid fraction containing soluble sugars is recycled back to a biomass pretreatment stage and/or a fermentation stage in a process for the production of ethanol as previously described elsewhere herein. For example, if the fermentation stage comprises a separate xylose fermentation operation, then the liquid fraction containing soluble sugars may be introduced, with or without conditioning, to such operation. By way of further example, the liquid fraction containing soluble sugars may also be added to pretreated biomass materials, with or without prior conditioning, for dilution and residual sugar recovery purposes.

The solids component enriched in lignin recovered from the solid-liquid separation stage typically comprises a lignin content from about 30 wt. % to about 50 wt. % (more typically from about 35 wt. % to about 45 wt. %). Moreover, the solids component enriched in lignin typically comprises a carbohydrate content no greater than about 15 wt. % or no greater than about 10 wt. %. In various embodiments the carbohydrate content is from about 0.1 wt. % to about 15 wt. % and more preferably from about 4 wt. % to about 10 wt. %. In these and various other embodiments, the solids component enriched in lignin typically has a water-soluble sugar content of no greater than about 1 wt. %. When high inorganic-containing biomass feedstocks (e.g., agricultural wastes, energy crops, and non-woody plant biomass) are used to produce ethanol, the solids component enriched in lignin comprises an inorganic content from about 30 wt. % to about 55 wt. % and more typically from about 35 wt. % to about 55 wt. %, and even more typically from about 40 wt. % to about 50 wt. %. In these embodiments, the inorganic content typically consists from about 60 wt. % to about 80 wt. % silica (and more typically from about 65 wt. % to about 75 wt. % silica). However, when biomass feedstocks containing low concentrations of inorganics are used (e.g., woody biomass feedstocks), the solids component enriched in lignin comprises an inorganic content from about 0.1 wt. % to about 5 wt. % and more typically from about 0.1 wt. % to about 2 wt. %. In these and various other embodiments, the solids component enriched in lignin has a particle size distribution such that at least about 85% by weight passes through a screen having a mesh size of about U.S. Sieve No. 70 (210 μm) and no more than about 45% by weight of the component passes through a screen having a mesh size of about U.S. Sieve No. 325 (45 μm). In various other embodiments, the solids component enriched in lignin has a particle size distribution such that at least about 80% by weight passes through a screen having a mesh size of about U.S. Sieve No. 100 (150 μm) and no more than about 45% by weight of the component passes through a screen having a mesh size of about U.S. Sieve No. 325 (45 μm).

The solids component enriched in lignin 165 recovered in the solid-liquid separation stage may be dried or reslurried and sent to storage tanks to await further processing (not shown on FIG. 1), fed to a lignin separation process, fed to a gasification and/or combustion process, used as an additive in concrete formulations, or divided among two or more of such processes or uses.

Figure 2:
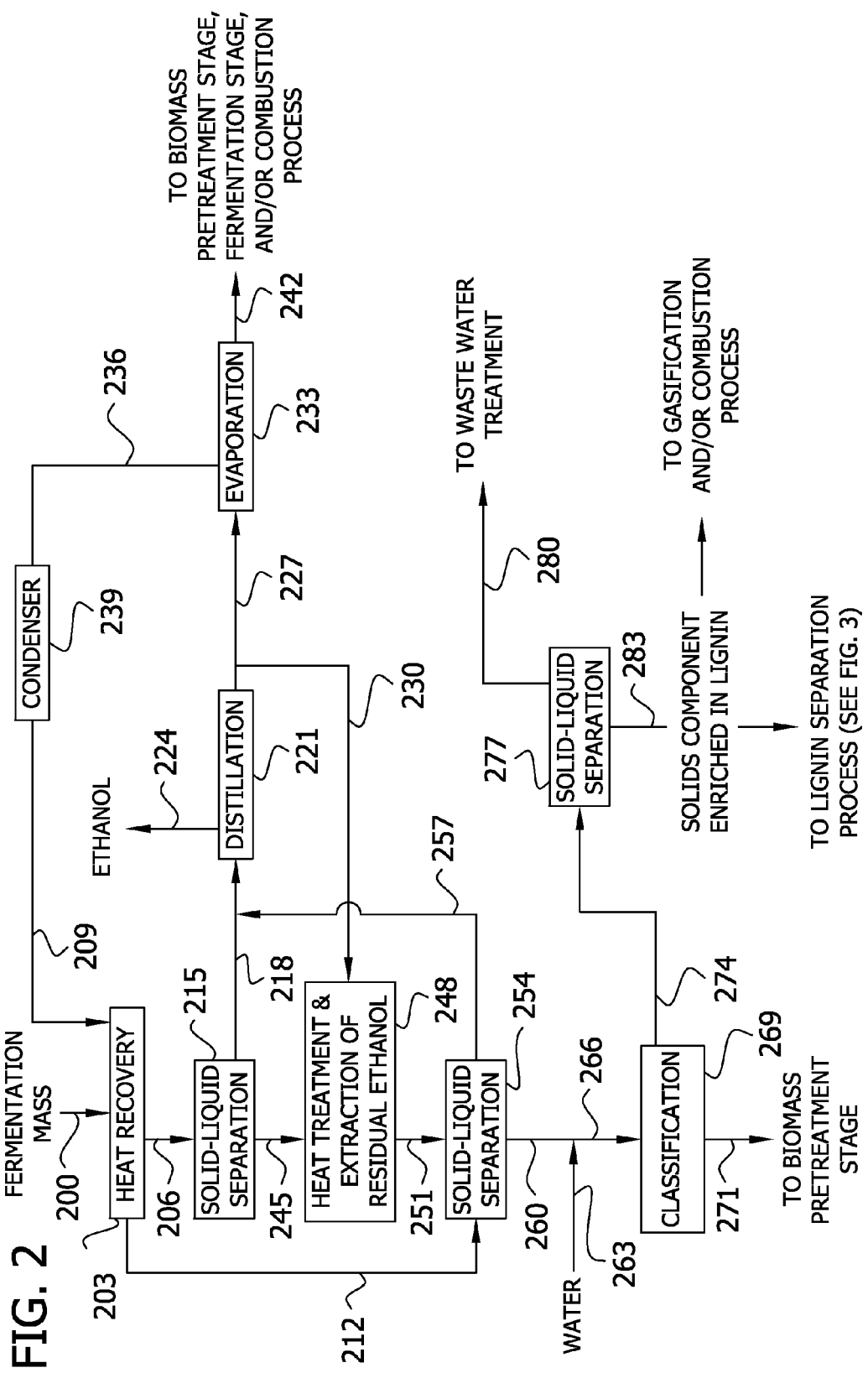
FIG. 2 depicts a process flow of one embodiment of a process for the recovery of crude ethanol, lignin, and carbohydrate values from a fermentation mass that has not been subjected to distillation for recovery of ethanol.

FIG. 2 depicts another embodiment of a process of the present invention and, in particular, describes a recovery process which includes classifying the solids component of a fermentation mass (i.e., that has not been subjected to distillation) to produce a solids fraction enriched in carbohydrates relative to the carbohydrate content of the solids component of the fermentation mass and a crude aqueous lignin slurry fraction comprising a solids component enriched in lignin relative to the lignin content of the solids fraction enriched in carbohydrates. The recovery process may be practiced on a batch, semi-batch or continuous basis.

The fermentation mass is typically a mixture containing ethanol, lignin, protein, inorganics (e.g., $SiO_2$, CaO, MgO, KO, $Fe_2O_3$, $P_2O_5$, $Al_2O_3$, etc.), unreacted or partially reacted carbohydrates, residual sugars, and water. The temperature of the fermentation mass typically ranges from ambient temperature to about 90° C.

Now referring to FIG. 2, the fermentation mass 200 may be received from one or more fermentation stages or storage tanks (not shown on FIG. 2) and passed through optional heat recovery stage 203 to the reduce the temperature of the fermentation mass to preferably from about 50° C. to about 75° C. and more preferably from about 50° C. to about 70° C. The medium heated in the heat recovery stage typically includes process water, such as the condensate 209 from evaporation stage 233.

Fermentation mass 206 from one or more storage tanks, a fermentation stage, and/or from heat recovery stage 203 is introduced into solid-liquid separation stage 215. In solid-liquid separation stage 215, a liquid fraction comprising ethanol is separated from a fermentation solids fraction comprising the solids component of the fermentation mass. Solid-liquid separation stage 215 proceeds in accordance with means known in the art including, for example filtration, centrifugation, and combinations thereof. In various embodiments, solid-liquid separation stage comprises one or more centrifuges. In various other embodiments, the solid-liquid separation stage includes a filtration system. Typically, the filtration media used has a nominal pore size from about 8 to about 25 microns. In particularly preferred embodiments, the filtration media has a nominal pore size of about 8 microns. In other embodiments, the solid-liquid stage includes a belt filter press.

Subjecting a fermentation mass to a solid-liquid separation stage instead of introducing the mass directly to a distillation stage beneficially reduces heat requirements and increases capacity of the distillation stage as a result of the reduced amount of materials fed to the distillation stage. Moreover, because the fraction fed to the distillation stage after solid-liquid separation is depleted in solids, fouling of distillation equipment is reduced. Consequently, heat transfer losses caused by fouling and maintenance associated with the fouling of distillation equipment are also reduced. While some ethanol is unavoidably retained in the fermentation solids fraction following the solid-liquid separation, this ethanol may be recovered as described below.

Now referring back to FIG. 2, the liquid fraction comprising ethanol 218 is typically introduced to a distillation stage 221 wherein ethanol is recovered in overhead stream 224 and residual thin stillage 227 is recovered in the bottoms of the distillation stage. Typically, residual thin stillage contains soluble sugars comprising pentoses (e.g., xylose) and hexoses (e.g., glucose). In various embodiments, the sugars contained in residual thin stillage 227 are from about 60 wt. % to 80 wt. % pentoses and from about 20 wt. % to about 40 wt. % hexoses. In these and various other embodiments, at least a portion of residual thin stillage is recycled back to heat treatment/extraction stage 248 (via line 230).

Residual thin stillage 227 may also be introduced to an evaporation stage 233 wherein sugars contained in the residual thin stillage are concentrated, forming thin stillage syrup comprising sugars. Overhead stream 236 comprising water vapor exits the evaporator and may be condensed in condenser 239. In various embodiments, at least a portion of condensate 209 is recycled to heat recovery stage 203 (via line 209).

In various embodiments, at least of a portion of the concentrated thin stillage syrup 242 is recycled back to a biomass pretreatment and/or fermentation stage in a process for the production of ethanol as previously described elsewhere herein, and/or sent to a combustion process.

The fermentation solids fraction 245 comprising the solids component of the fermentation mass exiting the solid-liquid separation stage 215 may be introduced to heat treatment/extraction stage 248 where residual ethanol entrained therein is extracted and the fermentation solids fraction is sterilized. Sterilization of the fermentation solids is necessary to kill any remaining micro-organisms. Heat treatment necessary for sterilization is typically conducted at a temperature from about 60° C. to about 95° C. and more preferably from about 90° C. to about 95° C. Moreover, heating at these temperatures facilitates extraction of ethanol. To extract residual ethanol, the fermentation solids fraction is contacted with an extraction solvent. The extraction solvent may comprise any solvent capable of extracting ethanol (e.g., water). In various embodiments, the extraction solvent comprises thin stillage obtained by separating stillage solids from whole stillage or obtained in distilling a fermentation mass in a process for the production of ethanol. Alternatively, referring to FIG. 2, wherein a fermentation solids fraction is removed from the fermentation mass prior to distillation, at least a portion of thin stillage obtained from distillation stage 221, may be fed to heat treatment/extraction stage 248 via line 230. Using a stream of thin stillage advantageously provides at least a portion of the heating value for thermo-sterilization of fermentation solids as well as a suitable ethanol extraction solvent.

The slurry 251 comprising extraction solvent comprising residual ethanol and the fermentation solids fraction suspended therein is then introduced to a solid-liquid separation stage 254 to separate the extraction solvent comprising ethanol from the fermentation solids fraction. The solid-liquid separation stage 254 proceeds in accordance with means known in the art including, for example filtration, centrifugation, and combinations thereof. In various embodiments, solid-liquid separation stage 254 proceeds as previously described for solid-liquid separation stage 215. The separation may include additional washing of solid materials with process water 212 obtained, for example, from heat recovery stage 203.

The liquid fraction 257 comprising extraction solvent comprising residual ethanol is preferably transferred to distillation stage 221 to recover the residual ethanol.

The fermentation solids fraction 260 comprising the solids component of the fermentation mass exiting solid-liquid stage 254 is reslurried with water 263 to contain from about 5 wt. % to about 20 wt. % solids, more preferably from about 5 wt. % to about 15 wt. % solids, and still more preferably from about 10 wt. % to about 15 wt. % solids.

The reslurried fermentation solids fraction 266 is then introduced to classification stage 269, where the solids component of the fermentation mass contained therein is classified into two or more fractions. In accordance with the present invention, classification of the solids component of the fermentation mass (i.e., the fermentation solids fraction comprising the solids component of the fermentation mass) provides for recovery of a solids fraction enriched in carbohydrates relative to the carbohydrate content of the solids component of the fermentation mass and a crude aqueous lignin slurry fraction comprising a solids component enriched in lignin relative to the lignin content of the solids fraction enriched in carbohydrates. In various embodiments of the present invention, classification of the solids component of a fermentation mass provides for recovery of a solids fraction enriched in carbohydrates relative to the carbohydrate content of the solids component of the fermentation mass and a crude aqueous lignin slurry fraction comprising a solids component enriched in lignin relative to the lignin content of the solids component of the fermentation mass.

Classification proceeds as previously described for the process of FIG. 1. Accordingly, when a screen separation system is used, a solids fraction enriched in carbohydrates relative to the carbohydrate content of the solids component of the fermentation mass is retained on at least one screen. Further, where a slurry comprises a fermentation mass or a concentrate thereof is introduced to the at least one screen, a crude aqueous lignin slurry fraction comprising a solids component enriched in lignin passes through the at least one screen. In various embodiments, a process according to the present invention comprises introducing the solids component of the fermentation mass or dilution thereof to a screen separation system comprising a screen sized for removal of a coarse particulate comprising the solids fraction enriched in carbohydrates, passing the liquid phase through the screen while retaining the coarse particulate on the screen, removing the crude aqueous lignin slurry from the screen separation system, the crude aqueous lignin slurry fraction comprising the solids component enriched in lignin. In these embodiments, the crude aqueous lignin slurry fraction may be subjected to further solid-liquid separation, thereby separating the solids component enriched in lignin from a liquid fraction.

In various preferred embodiments, the screen separation system includes a single screen. Typically, the screen has openings of about 150 μm to about 210 μm (e.g., a mesh size from about U.S. Sieve No. 100 (150 μm) to about U.S. Sieve No. 70 (210 μm)). Therefore, in various embodiments, the particle size of the fraction enriched in carbohydrates is such that the fraction is retained on a screen having openings of about 150 μm to about 210 μm and the particle size of the solids component enriched in lignin of the crude aqueous lignin slurry fraction is such that the fraction passes through the screen having openings of about 150 μm to about 210 μm. In these and other embodiments, the particle size of the fraction enriched in carbohydrates is such that the fraction is retained on a screen having a mesh size from about U.S. Sieve No. 100 (150 μm) to about U.S. Sieve No. 70 (210 μm) and the particle size of the solids component enriched in lignin of the crude aqueous lignin slurry fraction is such that the fraction passes through the screen having a mesh size from about U.S. Sieve No. 100 (150 μm) to about U.S. Sieve No. 70 (210 μm).

In various other embodiments, the screening separation system includes two screens. Typically, the first screen has openings of about 210 μm (e.g., a mesh size of about U.S. Sieve No. 70 (210 μm)) and the second screen has openings of about 150 μm (e.g., a mesh size of about U.S. Sieve No. 100 (150 μm)). The particle size of the solids fraction enriched in carbohydrates is such that the fraction is retained on the first screen and the particle size of the solids component enriched in lignin of the crude aqueous lignin slurry fraction is such that the fraction passes through the first and second screen. An intermediate fraction that passes through the first screen but is retained on the second screen (e.g., −70/+100 fraction) is typically enriched in inorganics. The intermediate fraction enriched in inorganics may be used in drilling mud and/or concrete formulations.

In another embodiment, the classification stage 269 includes introducing the reslurried fermentation solids fraction 266 comprising the solids component of the fermentation mass, to the first of a series of classifying screens comprising successive screens having openings of progressively decreasing size and causing the liquid phase to pass through the entire series of screens, thereby recovering: (a) a coarse particulate comprising the solids fraction enriched in carbohydrates on the first of the series of screens, (b) an intermediate particulate comprising a solids fraction enriched in inorganics, and (c) one or more progressively finer particulates comprising the solids fractions enriched in lignin on successive screens downstream of the first screen with respect to the direction of liquid flow, and providing a liquid fraction exiting the last of the screens. In various embodiments, the series of screens includes screens having openings of about 210 µm (e.g., a mesh size of about U.S. Sieve No. 70 (210 µm)) and about 150 µm (e.g., a mesh size of about U.S. Sieve No. 100 (150 µm). In these and various other embodiments, the intermediate particulate comprising the solids fraction enriched in inorganics passes through a screen having openings of about 210 µm but is retained on a screen having openings of about 150 µm. Further, in these and various other embodiments, the intermediate particulate comprising the solids fraction enriched in inorganics passes through a screen having a mesh size of about U.S. Sieve No. 70 (210 µm) but is retained on a screen having a mesh size of about U.S. Sieve No. 100 screen (150 µm). In various embodiments, the last in the series of screens has a pore size from about 45 to about 100 microns. In other embodiments, the last in the series of screens has a pore size no larger than about 45 microns.

Again referring to FIG. 2, the fraction enriched in carbohydrates 271 may be recycled back to a biomass pretreatment stage in a process for the production of ethanol as previously describe elsewhere herein.

The crude aqueous lignin slurry fraction 274 comprising a solids component enriched in lignin exits the classification stage and is then introduced into solid-liquid separation stage 277. In this stage, a solids component enriched in lignin is separated from a liquid fraction comprising mostly waste water. Waste water 280 may be sent to waste water treatment.

The solids component enriched in lignin may be separated from the liquid fraction in accordance with means known in the art including, for example, filtration or centrifugation. In various preferred embodiments, solid-liquid separation stage 277 includes one or more centrifuges, more preferably one or more decanter centrifuges.

In other preferred embodiments, solid-liquid separation stage 277 includes a filtration system. Typically, the filtration medium used has a nominal pore size from about 8 to about 25 microns. In particularly preferred embodiments, the filtration medium has a nominal pore size of about 8 microns.

In various embodiments, the solids component enriched in lignin 283 exiting solid-liquid separation stage typically comprises a lignin content from about 30 wt. % to about 50 wt. % (more typically from about 35 wt. % to about 45 wt. %). Moreover, the solids component enriched in lignin typically comprises a carbohydrate content no greater than about 15 wt. % or no greater than about 10 wt. %. In various embodiments, the carbohydrate content is from about 0.1 wt. % to about 15 wt. % and more preferably from about 4 wt. % to about 10 wt. %. In these and various other embodiments, the solids component enriched in lignin typically has a water-soluble sugar content of no greater than about 1 wt. %. When high inorganic-containing biomass feedstocks (e.g., agricultural wastes, energy crops, and non-woody plant biomass) are used to produce ethanol, the solids component enriched in lignin comprises an inorganic content from about 30 wt. % to about 55 wt. % and more typically from about 35 wt. % to about 55 wt. %, and even more typically from about 40 wt. % to about 50 wt. %. In these embodiments, the inorganic content typically consists from about 60 wt. % to about 80 wt. % silica (and more typically from about 65 wt. % to about 75 wt. % silica). However, when biomass feedstocks containing low concentrations of inorganics are used (e.g., woody biomass feedstocks), the solids component enriched in lignin comprises an inorganic content from about 0.1 wt. % to about 5 wt. % and more typically from about 0.1 wt. % to about 2 wt. %. In these and various other embodiments, the solids component enriched in lignin has a particle size distribution such that at least about 85% by weight passes through a screen having a mesh size of about U.S. Sieve No. 70 (210 µm) and no more than about 45% by weight of the component passes through a screen having a mesh size of about U.S. Sieve No. 325 (45 µm). In various other embodiments, the solids component enriched in lignin has a particle size distribution such that at least about 80% by weight passes through a screen having a mesh size of about U.S. Sieve No. 100 (150 µm) and no more than about 45% by weight of the component passes through a screen having a mesh size of about U.S. Sieve No. 325 (45 µm).

The solids component enriched in lignin 283 recovered in the solid-liquid separation stage may be dried or reslurried and sent to storage tanks to await further processing (not shown on FIG. 2), fed to a lignin separation process, fed to a gasification and/or combustion process, used as an additive in concrete formulations, or divided among two or more of such processes or uses.

In another embodiment of a process of the present invention, a fermentation mass obtained in producing ethanol is divided into plural portions comprising a first fermentation mass portion and a second fermentation mass portion. The first fermentation mass portion is thereafter treated in accordance with the process described above in connection with FIG. 1. The second fermentation mass portion is thereafter treated in accordance with the process described above in connection with FIG. 2.

In other embodiments of the present invention, the above-disclosed processes may be integrated with solvent-based lignin extraction processes. For example, Belanger et al., U.S. Patent Application Publication No. 2009/0062516, disclose a process wherein lignin is extracted from biomass materials with an aqueous ethanol solution. Further, Zhu, International Patent Publication WO 2009/089439, discloses a process wherein lignin is extracted from biomass with a mixture of ammonium and ethanol. Upfal et al., U.S. Patent Application Publication No. 2007/0215300, disclose a process wherein lignin is extracted from various feedstocks with an ionic liquid, such as substituted or unsubstituted imidazolium, triazolium, pyrazolium, pyridinium, pyrrolidinium, piperidinium, ammonium, phosphonium or sulfonium salt of a substituted or unsubstituted aryl sulfonate, such as an ionic liquid salt of a xylene sulfonate. The entire contents of these references are incorporated herein by reference for all relevant purposes.

Accordingly, in various embodiments the component enriched in lignin may be contacted with a solvent, thereby producing an extract comprising dissolved lignin. In preferred embodiments the solvent comprises an organic solvent including, for example, ethanol, glycerol, acetone, and mixtures thereof. In these and other embodiments, the solvent comprises an ionic solvent.

Typically, the extract comprising dissolved lignin will be subjected to a separation step wherein the lignin is separated from the solvent. Separation of lignin from the solvent proceeds in accordance with means known in the art including, for example, distillation or evaporation.

IV. Recovery of Lignin and Inorganics

Figure 3:
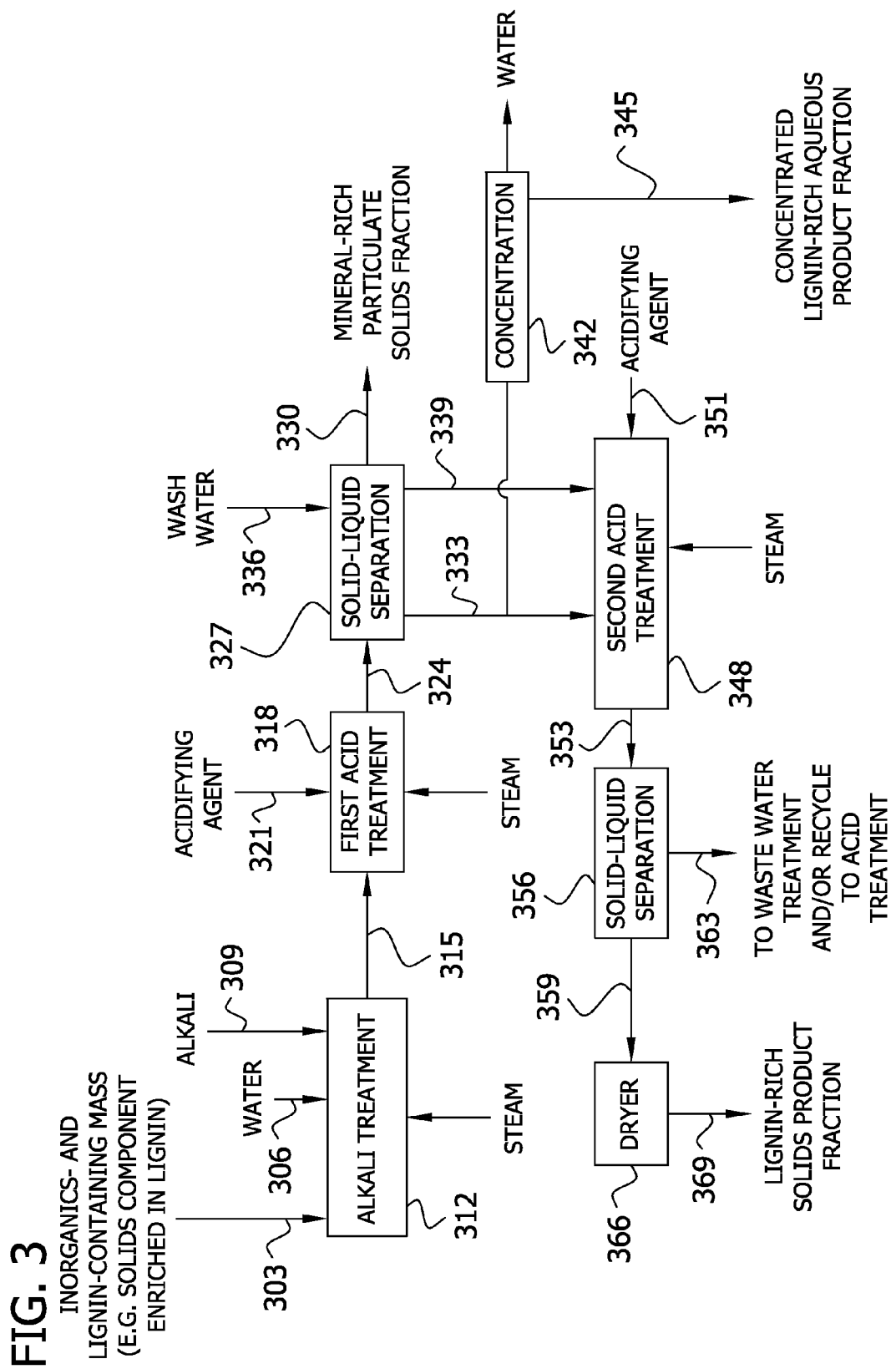
FIG. 3 depicts a process flow of another embodiment of a lignin recovery process which includes the dissolution and precipitation of lignin and inorganics.

FIG. 3 depicts another embodiment of a process of the present invention and, in particular, describes a recovery process which comprises recovering lignin and inorganics from an inorganic- and lignin-containing mass. Suitable inorganic- and lignin-containing masses include, for example, the solids component enriched in lignin obtained in processes described above in connection with FIGS. 1, 2, or combinations thereof. The following processes described herein may be practiced on a batch, semi-batch or continuous basis.

Now referring to FIG. 3, an inorganic- and lignin-containing mass 303 (e.g., the solids component enriched in lignin) is diluted with water 306 to provide an aqueous medium having a solids content from about 2 wt. % to 20 wt. %, more preferably to a solids content of from about 3 wt. % to 15 wt. %, and even more preferably at a solids content of about 5 wt. %. The inorganic- and lignin-containing containing mass may be diluted at any point, for example, in-line with water or upon introduction to alkali treatment stage 312.

The resulting aqueous medium is then introduced or subjected to alkali treatment stage 312 and contacted therein with an alkaline aqueous solution produced, for example, by introducing alkali 309 and water 306 to stage 312. Sufficient alkali is added to adjust the pH of the aqueous medium to between about 11.5 and about 13 and more preferably to a pH between about 12 and about 13. Within this pH range, lignin dissolves, thereby forming an aqueous alkaline extract fraction comprising dissolved lignin. Other components such as inorganics (e.g., silica) may also dissolve in this pH range. Within this pH range, the aqueous alkaline extract fraction is a thick viscous slurry that is difficult to separate with solid-liquid separation techniques.

Suitable alkalis for use in the alkali treatment stage include sodium hydroxide, calcium hydroxide, potassium hydroxide, and ammonium hydroxide. Preferably, the alkali is sodium hydroxide.

In these and other embodiments, after contacting the solids fraction enriched in lignin with an alkali in an aqueous medium having a pH from about 11.5 to about 13, the temperature of the aqueous medium is raised to between about ambient and about 120° C., more preferably between about 70° C. and about 100° C., and still more preferably between about 90° C. and about 95° C. (e.g., 95° C.). Moreover, it has been observed that temperature of the aqueous medium inversely affects the pH of the aqueous medium. Therefore, it is necessary to control addition of alkali either by controlling the pH of the aqueous medium or controlling the amount of alkali initially ratioed to the inorganics- and lignin-containing mass.

Control of the pH of the aqueous medium may be accomplished using methods known in the art. For example, a pH meter in fluid contact with the aqueous medium at the desired operating temperature could be used to determine if additional alkali was required to maintain the desired pH. Another method could entail adding a fixed amount of alkali to the aqueous medium at the feed temperature according to a correlation between the amount of alkali needed to achieve the desired pH at the desired operating temperature. Regardless of the control scheme selected, the alkali may be added to the aqueous medium before, during, and/or after heating to the desired operating temperature.

In various preferred embodiments, an optional cellulose protectant (not shown on FIG. 3) may be introduced to the alkali treatment stage 312. At high pH (e.g., 12-13) and high temperatures, cellulosic carbohydrates undergo substantial degradation causing some of the carbohydrates to dissolve with lignin. Cellulose protectants prevent this degradation of cellulosic carbohydrates and the associated carbohydrate contamination of the aqueous alkaline extract fraction comprising dissolved lignin. Suitable cellulose protectants typically include protective agents such as anthraquinone, $MgCl_2$, $MgCO_3$, $Mg(OH)_2$, or combinations thereof.

In various preferred embodiments, the temperature of the aqueous medium is raised to between about 70° C. and about 120° C. before or during contacting of the inorganic- and lignin-containing mass with an alkali in an aqueous medium, maintained in that temperature range while continuously stirring as dissolution of lignin proceeds, and thereafter lowered to between about 40° C. and about 60° C.

Again referring to FIG. 3, aqueous alkaline extract fraction 315 is introduced into a first acid treatment stage 318 and contacted with acidifying agent 321. Sufficient acidifying agent is added to the aqueous alkaline extract fraction 315 to adjust the pH to between about 7 and about 11, preferably between about 8 and about 11, more preferably between about 9 and about 10, and still more preferably to between about 9.5 and about 10. Within this pH range, inorganics (e.g., silica) precipitate while lignin remains dissolved in solution, thereby producing a slurry comprising particulate inorganic solids and dissolved lignin 324. In various embodiments, a precipitator or coagulant (not shown on FIG. 3) may be present in the first acid treatment stage to increase the rate of precipitation of inorganics. In these and various embodiments, the temperature of the alkaline extract fraction is typically lowered to between about 30° C. and about 50° C. prior to or simultaneously with contacting the aqueous alkaline extract fraction with an acidifying agent.

Suitable acidifying agents for use in the first acid treatment stage include sulfuric acid, hydrochloric acid, phosphoric acid and carbon dioxide (i.e., carbonic acid). Preferably the acidifying agent is either sulfuric acid or hydrochloric acid. When carbon dioxide is the acidifying agent, it may be obtained from a process for the production of ethanol from a biomass feedstock. For example, carbon dioxide may be obtained from a fermentation stage (i.e., from off gas of yeast propagation and/or fermentation operations) and/or a distillation stage in a process for the production of ethanol from a biomass feedstock.

Again referring to FIG. 3, the slurry comprising particulate inorganic solids and dissolved lignin 324 is subjected to a solid-liquid separation stage 327 to separate particulate inorganic solids from the slurry, thereby producing a mineral-rich particulate solids fraction 330 comprising inorganic solids and a lignin-rich aqueous fraction 333 comprising dissolved lignin. Typically, the mineral-rich particulate solids fraction may also contain residual biomass and other solid residues.

The mineral-rich particulate solids fraction may be separated from dissolved lignin in accordance with means known in the art including, for example decantation, filtration, centrifugation, and combinations thereof. In various embodiments, the solid-liquid separation stage 327 includes a decantation vessel and filtration unit wherein the particulate inorganics settle from the slurry in the decantation vessel. Typically, precipitated inorganics settle to the bottom of a decantation vessel within about 1 to about 12 hours. The liquid phase in the decantation vessel can then be removed and sent to a filtration unit wherein residual suspended solids (e.g., inorganics residues, insoluble biomass, and undissolved lignin) are removed from solution. The settled solids remaining in the decantation vessel may preferably be washed with hot water 336 (e.g., at about 70° C. to about 90° C.) at a pH of about 8 to about 10 to remove residual lignin. The wash water 339 comprising residual dissolved lignin may be mixed in-line (not shown) with the lignin-rich aqueous fraction exiting the filtration unit or introduced separately to second acid treatment stage 348.

The mineral-rich particulate solids fraction typically comprises a silica content from about 55% to about 75% on a dry weight basis (preferably from about 60% to about 70% on a dry weight basis) and a non-silica inorganic content from about 25% to about 35% on a dry weight basis. Moreover, the mineral-rich particulate solids fraction typically comprises a lignin content no greater than about 15% on a dry weight basis (preferably no greater than about 10% or about 5% on a dry weight basis). In various embodiments, the mineral-rich particulate solids fraction comprises a lignin content from about 0.1% to about 15% on a dry weight basis or from about 1% to about 15% on a dry weight basis. The mineral-rich particulate solids fraction also typically comprises a carbohydrate content no greater than about 10% and more preferably no greater than about 5% on a dry weight basis. In these and various other embodiments, the mineral-rich particulate solids fraction comprises a carbohydrate content from about 0.1% to about 10% (more preferably from about 1% to about 10%) on a dry weight basis. Further, in various embodiments, the mineral-rich particulate solids fraction comprises a particle size distribution such that at least about 85% by weight passes through a screen having a mesh size of about U.S. Sieve No. 70 (210 μm) and no more than about 45% by weight of the fraction passes through a screen having a mesh size of about U.S. Sieve No. 325 (45 μm). In other embodiments, the mineral-rich particulate solids fraction comprises a particle size distribution such that at least about 80% by weight passes through a screen having a mesh size of about U.S. Sieve No. 100 (150 μm) and no more than about 40% by weight of the fraction passes through a screen having a mesh size of about U.S. Sieve No. 325 (45 μm).

In other embodiments, solid-liquid separation stage 327 comprises a two-stage centrifugation operation (not shown on FIG. 3). In the first centrifugation stage, a lignin-rich aqueous fraction is separated from the mineral-rich particulate solids fraction comprising particles enriched in silica and other residual solids. In the second centrifugation stage, the mineral-rich particulate solids fraction or an aqueous dilution thereof is centrifuged to produce a silica-rich solids fraction and a silica-poor fraction. The silica-poor fraction typically comprises a slurry comprising particles relatively depleted in silica. In various embodiments, the second centrifugation stage is operated at a greater gravitational force than the first centrifugation stage.

In these and various other embodiments, the mineral-rich particulate solids fraction, silica-rich fraction, and/or silica-poor fraction may be introduced to an optional drying stage (not shown on FIG. 3) to reduce the moisture content of the fraction(s).

The mineral-rich particulate solids fraction and silica-poor fraction may be packaged and sold as fertilizer or incorporated into a fertilizer formulation. The silica-rich fraction may be packaged and sold as adsorbent. Additionally or alternatively, the silica-rich fraction may be washed with hydrogen peroxide to provide a white silica sand product useful for filtration media and industrial uses where silicon dioxide is a raw material (e.g., the glassmaking industry).

The lignin-rich aqueous fraction 333 exiting the solid-liquid separation stage 327 typically comprises from about 70 wt. % to about 90 wt. % lignin, no greater than about 10 wt. % inorganics, and no greater than about 10 wt. % carbohydrates, all on an alkali metal-free and moisture-free basis. In various embodiments, the lignin-rich aqueous fraction comprises an inorganic content from about 0.1 wt. % to about 10 wt. % (more preferably from about 5 wt. % to about 10 wt. %) on an alkali metal-free and moisture-free basis. In these and various other embodiments, the lignin-rich aqueous fraction comprises a carbohydrate content from about 0.1 wt. % to about 10 wt. % (more preferably from about 5 wt. % to about 10 wt. %) on an alkali metal-free and moisture-free basis.

In various embodiments, at least a portion of the lignin-rich aqueous fraction 333 is introduced to a concentration stage 342 capable of concentrating the lignin-rich aqueous product by evaporation of water, thereby producing a concentrated lignin-rich aqueous product 345. The concentrated lignin-rich aqueous product typically comprises a lignin content from about 8 wt. % to about 20 wt. % and more preferably from about 10 wt. % to about 15 wt. %. Moreover, the concentrated lignin-rich aqueous product typically comprises an inorganic content no greater than about 1 wt. % (more preferably no greater than about 0.4 wt. %). In various embodiments, the concentrated lignin-rich aqueous product comprises an inorganic content from about 0.1 wt. % to about 1 wt. % (more preferably from about 0.5 wt. % to about 1 wt. %). Typically, the concentrated lignin-rich aqueous product comprises a carbohydrate content no greater than about 0.5 wt. % (more preferably no greater that about 0.2 wt. %). In these and various other embodiments, the concentrated lignin-rich aqueous product comprises a carbohydrate content from about 0.05 wt. % to about 0.5 wt. %. In these and various other embodiments, the concentrated lignin-rich aqueous product typically has a pH from about 7 to about 11, preferably from about 8 to about 11, more preferably from about 9 to about 10, and still more preferably to from about 9.5 to about 10. The concentrated lignin-rich aqueous product may be used in adhesive formulations for use in, for example, particle board, medium density fiber board (MDF), plywood, and oriented strand board (OSB).

Now referring back to FIG. 3, the alkaline lignin-rich aqueous fraction 333 and wash water comprising residual dissolved lignin 339 may be introduced into a second acid treatment stage 348 and contacted with acidifying agent 351. Sufficient acidifying agent is added to the lignin-rich aqueous fraction to adjust the pH to a value at which lignin precipitates. Preferably the pH is adjusted to between about 1.5 and about 2.5, more preferably between about 1.6 and about 2, and still more preferably between about 1.8 and about 2. At this pH range, lignin rapidly precipitates, thereby producing a slurry comprising precipitated lignin 353. The precipitated lignin is hydrophobic and can easily be separated from the slurry. Typically, the lignin-rich aqueous fraction is heated to between about 30° C. and about 50° C. prior to or simultaneously with adjustment of pH.

Suitable acidifying agents for use in the second treatment stage include sulfuric acid, hydrochloric acid, and phosphoric acid. Preferably the acidifying agent is either sulfuric acid or hydrochloric acid.

In various embodiments, after contact with an acidifying agent, the slurry comprising precipitated lignin is heated to about 80° C. to increase particle size.

Referring again to FIG. 3, the slurry comprising precipitated lignin 353 is introduced to a solid-liquid separation stage 356. In this stage, a lignin-rich solids product fraction 359 is separated from a residual liquids fraction 363 containing acidifying agent and/or acid soluble organic and inorganics.

The lignin-rich solids product fraction may be separated from the residual liquids fraction in accordance with means known in the art including, for example, filtration, centrifugation, or combinations thereof. In various preferred embodiments, the solid-liquid separation stage 356 includes a filtration system. Typically, the filtration medium used has a nominal pore size from about 8 to about 25 microns. In particularly preferred embodiments, the filtration medium has a nominal pore size of about 8 microns.

The residual liquids fraction 363 may be discharged to waste water treatment. In various embodiments, at least a portion of the residual liquid fraction containing acidifying agent is recycled back to an acid treatment stage and more preferably the first acid treatment stage (not shown on FIG. 3).

The lignin-rich solids product fraction 359 may be introduced to an optional drying stage 366 wherein the moisture content of the solids fraction is reduced.

The lignin-rich solids product fraction typically comprises a lignin content of at least about 50%, more preferably at least about 60%, and still more preferably at least about 65% on a dry weight basis. In various embodiments, the lignin content of the lignin-rich solids product fraction is typically from about 60% to about 95%, from about 60% to about 90%, from about 60% to about 80%, or from about 80% to about 90% on a dry weight basis. Moreover, the lignin-rich solids product fraction typically comprises an inorganic content no greater than about 25%, more preferably no greater than about 20%, and still more preferably no greater than about 15% on a dry weight basis. In various embodiments, the lignin-rich solids product fraction comprises an inorganic content from about 0.1% to about 20% inorganics (more preferably from about 1% to about 20%) on a dry weight basis. The lignin-rich solids product fraction also typically comprises a carbohydrate content no greater than about 20%, more preferably no greater than about 15%, and still more preferably no greater than about 10% on a dry weight basis. In these and various other embodiments, the lignin-rich solids product fraction comprises a carbohydrate content from about 0.1% to about 10% (more preferably from about 1% to about 10%) on a dry weight basis. Further, in various embodiments, the lignin-rich solids product fraction comprises a particle size distribution such that at least about 85% by weight passes through a screen having a mesh size of about U.S. Sieve No. 70 (210 µm) and no more than about 45% by weight of the fraction passes through a screen having a mesh size of about U.S. Sieve No. 325 (45 µm). In other embodiments, the lignin-rich solids product fraction comprises a particle size distribution such that at least about 80% by weight passes through a screen having a mesh size of about U.S. Sieve No. 100 (150 µm) and no more than about 40% by weight of the fraction passes through a screen having a mesh size of about U.S. Sieve No. 325 (45 µm).

In various embodiments, at least a portion of the lignin-rich solids product fraction may be introduced to an optional second lignin recovery process (not shown on FIG. 3) which proceeds in general accordance with the process described above in connection with FIG. 3. Depending on the desired level of purity, process steps relating to the precipitation of inorganics may not be necessary.

Therefore, the optional second lignin recovery process generally includes adding sufficient alkali to adjust the pH at which lignin dissolves in an aqueous medium, thereby forming an aqueous medium comprising dissolved lignin. Subsequently, the aqueous medium comprising dissolved lignin is contacted with an acidifying agent in sufficient proportion to reduce the pH of the aqueous medium to a value at which the lignin precipitates. The precipitated lignin in the aqueous medium may then be introduced to a solid/liquid separation stage, thereby producing an enhanced lignin-rich solids product fraction and a residual liquids fraction comprising acidifying agent. The enhanced lignin-rich solids product fraction may be introduced to an optional drying stage wherein the moisture content of the solids fraction is reduced.

V. Recovery of a Silica-Rich Fraction

The present invention also relates to processes for the recovery of a solids fraction having enhanced silica content from a silica-containing mass. In various embodiments, the process provides for the recovery of a silica-rich fraction from a slurry comprising an alkaline aqueous phase comprising particulate inorganic solids and dissolved lignin. The process comprises (a) centrifuging the slurry in a first centrifugation stage to separate a lignin-rich aqueous fraction comprising dissolved lignin from a mineral-rich particulate solids fraction comprising particles enriched in silica; and (b) centrifuging the mineral-rich particulate solids fraction or an aqueous dilution thereof in a second centrifugation stage to produce a silica-rich solids fraction and a silica-poor fraction. The silica-poor fraction typically comprises a slurry comprising particles relatively depleted in silica. In various embodiments, the second centrifugation stage is operated at a greater gravitational force than the first centrifugation stage.

In these and various other embodiments, the mineral-rich particulate solids fraction, silica-rich fraction, and/or silica-poor fraction may be introduced to an optional drying stage to reduce the moisture content of the fraction(s). The silica-rich fraction may be packaged and sold as adsorbent. Additionally or alternatively, the silica-rich fraction may be washed with hydrogen peroxide to provide a white silica sand product useful for filtration media and industrial uses where silicon dioxide is a raw material (e.g., the glassmaking industry).

VI. Recovery of Ethanol from a Fermentation Mass

A fermentation mass obtained from a fermentation stage in a process for the production of ethanol is typically a mixture containing ethanol, lignin, protein, inorganics (e.g., $SiO_2$, CaO, MgO, KO, $Fe_2O_3$, $P_2O_5$, $Al_2O_3$, etc.), unreacted or partially reacted carbohydrates, residual sugars, and water. In conventional processes, the fermentation mass is introduced to a distillation stage (or storage tank preceding a distillation stage) for recovery of ethanol from the mass.

It has been discovered that a fermentation mass may be subjected to a solid-liquid separation stage prior to any distillation stage. Introducing the fermentation mass to a solid-liquid separation stage beneficially reduces heat requirements and increases capacity of the distillation stage as a result of the reduced amount of materials fed to the distillation stage. Moreover, because the fraction fed to the distillation stage after solid-liquid separation is depleted in solids, fouling of distillation equipment is reduced. Consequently, heat transfer losses caused by fouling and maintenance associated with the fouling of distillation equipment are also reduced.

The solid-liquid separation stage proceeds in accordance with means known in the art including, for example filtration, centrifugation, or combinations thereof. In various embodiments, the solid-liquid separation stage comprises one or more centrifuges. In various other embodiments, the solid-liquid separation stage includes a filtration system. Typically, the filtration media used has a nominal pore size from about 8 to about 25 microns. In particularly preferred embodiments, the filtration media has a nominal pore size of about 8 microns. In other embodiments, the solid-liquid stage includes a belt filter press.

While some ethanol is unavoidably retained in the fermentation solids fraction following the solid-liquid separation stage, this ethanol may be recovered by subjecting the fermentation solids fraction to a heat treatment/extraction stage wherein residual ethanol entrained therein is extracted and the fermentation solids fraction is sterilized. Sterilization of the fermentation solids is necessary to kill any remaining micro-organisms. Heat treatment necessary for sterilization is typically conducted at a temperature from about 60° C. to about 95° C. and more preferably from about 90° C. to about 95° C. Moreover, heating at these temperatures facilitates extraction of ethanol. To extract residual ethanol, the fermentation solids fraction is contacted with an extraction solvent. The extraction solvent may comprise any solvent capable of extracting ethanol (e.g., water). Additionally or alternatively, the extraction solvent may comprise thin stillage obtained by separating stillage solids from whole stillage or obtained in distilling a fermentation mass in a process for the production of ethanol. Also, as in shown in FIG. 2, where a fermentation solids fraction is removed from the fermentation mass prior to distillation, at least a portion of thin stillage obtained from a distillation stage may be fed to heat treatment/extraction stage. Using a stream of thin stillage advantageously provides at least a portion of the heating value for thermo-sterilization of fermentation solids as well as a suitable ethanol extraction solvent.

Following the heat treatment/extraction stage, a slurry comprising extraction solvent comprising residual ethanol and the fermentation solids fraction suspended therein may then be introduced to a solid-liquid separation stage to separate the extraction solvent comprising ethanol from the fermentation solids fraction. The solid-liquid separation stage proceeds in accordance with means known in the art including, for example filtration, centrifugation, or combinations thereof. The separation may also include additional washing of solid materials with process water. The liquid fraction comprising extraction solvent comprising residual ethanol is then preferably transferred to a distillation stage to recover the residual ethanol.

Therefore, the present invention is also directed to processes for the recovery of crude ethanol from a fermentation mass. In various embodiments, the process comprises subjecting the fermentation mass comprising ethanol to a solid-liquid separation, thereby separating a liquid fraction comprising ethanol from a fermentation solids fraction comprising the solids component of the fermentation mass.

In various embodiments, the process further comprises contacting the fermentation solids fraction with an extraction solvent, thereby extracting residual ethanol entrained therein; and sterilizing the fermentation solids fraction by heating the fermentation solids fraction to a temperature of at least about 60° C. (and more preferably from about 90° C. to about 95° C.). In various embodiments, the extraction solvent comprises water. In these and other embodiments, the extraction solvent comprises thin stillage obtained from a distillation stage in a process for the production of ethanol. Preferably, the thin stillage provides at least a portion of the heating value required to heat the fermentation solids fraction for sterilization.

In various embodiments, the process further comprises separating the fermentation solids fraction from the extraction solvent comprising residual ethanol. In these embodiments, the extraction solvent comprising residual ethanol is transferred to a distillation stage in a process for the production of ethanol for recovery of the residual ethanol.

VII. Products and Solutions

The present invention also relates to various lignin-containing products and solutions and mineral-rich products. These various products and solutions may be produced from any process, including, for example, the processes of the present invention.

One lignin-containing product of the present invention is a particulate solids product (e.g., the solids component enriched in lignin produced in accordance with the processes of the present invention), which is a useful intermediate or raw material for lignin and/or inorganics recovery processes or is useful as an additive in concrete formulation. The particulate solids product typically comprises a lignin content from about 30 wt. % to about 50 wt. % (more typically from about 35 wt. % to about 45 wt. %). Moreover, the particulate solids product typically comprises a carbohydrate content no greater than about 15 wt. % or no greater than about 10 wt. %. In various embodiments the carbohydrate content is from about 0.1 wt. % to about 15 wt. % and more preferably from about 4 wt. % to about 10 wt. %. In these and various other embodiments, the particulate solids product typically has a water-soluble sugar content of no greater than about 1 wt. %. In various embodiments, the particulate solids product comprises an inorganic content from about 30 wt. % to about 55 wt. % and more typically from about 35 wt. % to about 55 wt. %, and even more typically from about 40 wt. % to about 50 wt. %. In these embodiments, the inorganic content typically consists from about 60 wt. % to about 80 wt. % silica (and more typically from about 65 wt. % to about 75 wt. % silica). In other embodiments, the particulate solids product comprises an inorganic content from about 0.1 wt. % to about 5 wt. % and more typically from about 0.1 wt. % to about 2 wt. %. In these and various other embodiments, the particulate solids product has a particle size distribution such that at least about 85% by weight passes through a screen having a mesh size of about U.S. Sieve No. 70 (210 µm) and no more than about 45% by weight of the product passes through a screen having a mesh size of about U.S. Sieve No. 325 (45 µm). In various other embodiments, the particulate solids product has a particle size distribution such that at least about 80% by weight passes through a screen having a mesh size of about U.S. Sieve No. 100 (150 µm) and no more than about 45% by weight of the product passes through a screen having a mesh size of about U.S. Sieve No. 325 (45 µm).

Another lignin-containing product of the present invention is a lignin-rich solids product (e.g., the lignin-rich solids product fraction produced in accordance with the processes of the present invention), which is useful as a fuel or fuel additive and as a raw material for a variety of products including flame retardants, slow-release agents for agricultural and pharmaceutical products, surfactants, asphalt/concrete extenders, drilling mud, and plastics. The lignin-rich solids product typically comprises a lignin content of at least about 50%, more preferably at least about 60%, and still more preferably at least about 65% on a dry weight basis. In various embodiments, the lignin content of the lignin-rich solids product is typically from about 60% to about 95%, from about 60% to about 90%, from about 60% to about 80%, and from about 80% to about 90% on a dry weight basis. Moreover, the lignin-rich solids product typically comprises an inorganic content no greater than about 25%, more preferably no greater than about 20%, still more preferably no greater than about 15% on a dry weight basis. In various embodiments, the lignin-rich solids product comprises an inorganic content from about 0.1% to about 20% inorganics (more preferably from about 1% to about 20%) on a dry weight basis. The lignin-rich solids product also typically comprises a carbohydrate content no greater than about 20%, more preferably no greater than about 15%, and still more preferably no greater than about 10% on a dry weight basis. In these and various other embodiments, the lignin-rich solids product comprises a carbohydrate content from about 0.1% to about 10% (more preferably from about 1% to about 10%) on a dry weight basis. Further, in various embodiments, the lignin-rich solids product comprises a particle size distribution such that at least about 85% by weight passes through a screen having a mesh size of about U.S. Sieve No. 70 (210 μm) and no more than about 45% by weight of the product passes through a screen having a mesh size of about U.S. Sieve No. 325 (45 μm). In other embodiments, the lignin-rich solids product comprises a particle size distribution such that at least about 80% by weight passes through a screen having a mesh size of about U.S. Sieve No. 100 (150 μm) and no more than about 40% by weight of the product passes through a screen having a mesh size of about U.S. Sieve No. 325 (45 μm).

One lignin-containing solution of the present invention is a lignin-rich aqueous solution (e.g., the lignin-rich aqueous fraction produced in accordance with the processes of the present invention), which is useful as an intermediate or raw material for lignin recovery processes or processes for the production of a concentrated lignin-rich aqueous solution, which is useful for adhesive formulations in, for example, particle board, medium density fiber board (MDF), plywood, and oriented strand board (OSB). The lignin-rich aqueous solution typically comprises from about 70 wt. % to about 90 wt. % lignin, no greater than about 10 wt. % inorganics, and no greater than about 10 wt. % carbohydrates, all on an alkali metal-free and moisture-free basis. In various embodiments, the lignin-rich aqueous solution comprises an inorganic content from about 0.1 wt. % to about 10 wt. % (more preferably from about 5 wt. % to about 10 wt. %) on an alkali metal-free and moisture-free basis. In these and various other embodiments, the lignin-rich aqueous solution comprises a carbohydrate content from about 0.1 wt. % to about 10 wt. % (more preferably from about 5 wt. % to about 10 wt. %) on an alkali metal-free and moisture-free basis.

Another lignin-containing solution of the present invention is a concentrated lignin-rich aqueous solution (e.g., the concentrated lignin-rich aqueous product produced in accordance with the processes of the present invention), which is useful for adhesive formulations in, for example, particle board, medium density fiber board (MDF), plywood, and oriented strand board (OSB). The concentrated lignin-rich aqueous solution typically comprises a lignin content from about 8 wt. % to about 20 wt. % and more preferably from about 10 wt. % to about 15 wt. %. Moreover, the concentrated lignin-rich aqueous solution typically comprises an inorganic content no greater than about 1 wt. % (more preferably no greater than about 0.4 wt. %). In various embodiments, the concentrated lignin-rich aqueous solution comprises an inorganic content from about 0.1 wt. % to about 1 wt. % (more preferably from about 0.5 wt. % to about 1 wt. %). Typically, the concentrated lignin-rich aqueous solution comprises a carbohydrate content no greater than about 0.5 wt. % (more preferably no greater that about 0.2 wt. %). In these and various other embodiments, the concentrated lignin-rich aqueous solution comprises a carbohydrate content from about 0.05 wt. % to about 0.5 wt. %. In these and various other embodiments, the concentrated lignin-rich aqueous solution typically has a pH from about 7 to about 11, preferably from about 8 to about 11, more preferably from about 9 to about 10, and still more preferably to from about 9.5 to about 10.

A mineral-rich product of the present invention is a mineral-rich particulate solids product (e.g., the mineral-rich particulate solids fraction produced in accordance with the processes of the present invention), which is has a variety of uses including fertilizer or for incorporation into a fertilizer formulation. Moreover, the product or purified form thereof may be used as adsorbent, filtration media, or for industrial uses where silicon dioxide is a raw material (e.g., the glassmaking industry). The mineral-rich particulate solids product typically comprises a silica content from about 55% to about 75% on a dry weight basis (preferably from about 60% to about 70% on a dry weight basis) and a non-silica inorganic content from about 25% to about 35% on a dry weight basis. Moreover, the mineral-rich particulate solids product typically comprises a lignin content no greater than about 15% on a dry weight basis (preferably no greater than about 10% or about 5% on a dry weight basis). In various embodiments, the mineral-rich particulate solids product comprises a lignin content from about 0.1% to about 15% on a dry weight basis, or from about 0.1% to about 15% on a dry weight basis. The mineral-rich particulate solids product also typically comprises a carbohydrate content no greater than about 10% and more preferably no greater than about 5% on a dry weight basis. In these and various other embodiments, the mineral-rich particulate solids product comprises a carbohydrate content from about 0.1% to about 10% (more preferably from about 1% to about 10%) on a dry weight basis. Further, in various embodiments, the mineral-rich particulate solids product comprises a particle size distribution such that at least about 85% by weight passes through a screen having a mesh size of about U.S. Sieve No. 70 (210 μm) and no more than about 45% by weight of the fraction passes through a screen having a mesh size of about U.S. Sieve No. 325 (45 μm). In other embodiments, the mineral-rich particulate solids product comprises a particle size distribution such that at least about 80% by weight passes through a screen having a mesh size of about U.S. Sieve No. 100 (150 μm) and no more than about 40% by weight of the fraction passes through a screen having a mesh size of about U.S. Sieve No. 325 (45 μm).

VIII. Methods for Determining Compositions

The following describes sampling preparation procedures and methods for determining the compositions of the various fractions products, and solutions described herein.

A. Solids Component of Fermentation Mass and Whole Stillage

1. A 200 ml representative sample of the fermentation mass or whole stillage is filtered on 8 micron (μm) filter paper in a 4-inch (10.2 cm) Buchner funnel at a terminal vacuum pressure of 100 mm Hg absolute (13.3 kPa) for 30 minutes at room temperature (about 22° C.).
2. After filtration has been carried out for 30 minutes, a 100 ml aliquot of deionized wash water is delivered to the filter and drawn through the filter cake under a terminal vacuum pressure of 100 mm Hg absolute (13.3 kPa) for 20 minutes at room temperature.
3. The washed cake is dried at 45° C. under a terminal vacuum pressure of 100 mm Hg absolute (13.3 kPa) until constant weight is achieved (change in weight is less than +/−1 wt. % upon reheating).
4. The dried cake is analyzed according to NREL analytical methods specified below.

B. Solids Component of Crude Aqueous Lignin Slurry Fraction or Particulate Solids Product The same sample preparation procedures used for the solids component of fermentation mass and whole stillage analysis are used for the crude aqueous lignin slurry fraction. The sample should be well-mixed and representative and should collected from a point after the screen but before the downstream solid-liquid separation stage. Following performance of the sample preparation procedure above, the dried cake is analyzed according to NREL analytical methods specified below.

C. Fraction-Enriched in Carbohydrates, Mineral-Rich Particulate Solids Fraction/Product; Silica-Rich Fraction; Silica-Poor Fraction and Lignin-Rich Solids Product/Fraction Samples of these solid fractions and products are dried at 105° C. under atmospheric pressure (760 mm Hg absolute; 101.3 kPa) until constant weight is achieved (change in weight is less than +/−1 wt. % upon reheating). The dried materials are analyzed according to NREL analytical methods specified below.

D. Lignin-Rich Aqueous Fraction/Solution and Concentrated Lignin-Rich Aqueous Product/Solution These compositions may be calculated by mass balance or according to the procedures described above for C.

E. NREL Analytical Methods

Analysis for carbohydrates and lignin is conducted using NREL laboratory analytical procedure entitled *Determination of Structural Carbohydrates and Lignin in Biomass*, Technical Report NREL/TP-510-42618, revised April 2008. Analysis for inorganics is conducted using NREL laboratory analytical procedure entitled *Determination of Ash in Biomass*, Technical Report NREL/TP-510-42622, revised January 2008. Analysis for protein may be conducted according to NREL laboratory analytical procedure entitled *Determination of Protein Content in Biomass*, Technical Report NREL/TP-510-42625, revised May 2008. Analysis for total solids is conducted using NREL laboratory analytical procedure entitled *Determination of Total Solids in Biomass and Total Dissolved Solids in Liquid Process Samples*, Technical Report NREL/TP-510-42621, revised March 2008. The entire contents of the abovementioned methods are incorporated herein by reference for all relevant purposes.

EXAMPLES

The present invention is illustrated by the following examples which are merely for the purpose of illustration and not to be regarded as limiting the scope of the invention or the manner in which it may be practiced.

Example 1

This example demonstrates the effects of filtering and washing on the compositional analysis of whole stillage samples.

A slurry of corn stover whole stillage containing approximately 5% to 15% by weight solids was obtained from the bottoms of a distillation column for the recovery of ethanol from a fermentation mass. From this slurry, samples were prepared according to the following procedures (A, B, and C).

A. Whole Stillage 50 g of whole stillage was dried to constant weight (change in weight is less than +/−1 wt. % upon reheating) in a vacuum oven at 45° C. and under a terminal vacuum pressure of 100 mm Hg absolute (13.3 kPa).

B. Whole Stillage Cake

A 100 g of whole stillage was filtered on an 8 μm media under a terminal vacuum pressure of 100 mm Hg absolute (13.3 kPa) for 30 minutes at room temperature. The filter cake was then dried to constant weight (change in weight is less than +/−1 wt. % upon reheating) in a vacuum oven at a temperature of 45° C. and under a terminal vacuum pressure of 100 mm Hg absolute (13.3 kPa).

C. Washed Whole Stillage Cake

A 100 g of whole stillage was filtered on an 8 μm media under a terminal vacuum pressure of 100 mm Hg absolute (13.3 kPa) for 30 minutes at room temperature. A 100 ml aliquot of deionized water was drawn through the filter cake under a terminal vacuum pressure of 100 mm Hg absolute (13.3 kPa) for 30 minutes at room temperature. The washed filter cake was then dried to constant weight (change in weight is less than +/−1 wt. % upon reheating) in a vacuum oven at 45° C. and under a terminal vacuum pressure of 100 mm Hg absolute (13.3 kPa).

The samples prepared above were analyzed for carbohydrates, lignin, inorganics, and protein according to NREL laboratory analytical procedure as previously mentioned. Table 1 provides a summary of the results determined by these methods.

TABLE 1

| Sample Type | Carbohydrate wt. % | Lignin wt. % | Inorganics wt. % | Protein wt. % | Total Recovered % |
|---|---|---|---|---|---|
| Whole Stillage | 29.33 | 48.56 | 21.44 | 7.65 | 106.98 |
| Whole Stillage Cake | 20.98 | 48.68 | 18.29 | 8.23 | 96.18 |
| Washed Whole Stillage Cake | 22.23 | 50.28 | 18.27 | 8.55 | 99.33 |

The results show that weight percents of carbohydrates, lignin, inorganics, and protein for whole stillage cake and washed whole stillage cake varied by about 1.5 wt. % or less between the samples. The weight percents determined for the whole stillage sample (unwashed and unfiltered) varied by a greater degree, especially for carbohydrates (up to about 8.5 wt. %). These results indicate that washing did not substantially affect the composition of a sample of whole stillage cake (which was filtered and dried prior to washing).

Example 2

This example demonstrates the relationship between corn stover stillage particle size and its compositional analysis.

A slurry of corn stover whole stillage containing approximately 5% to 15% by weight solids was obtained from the bottoms of a distillation column for the recovery of ethanol from a fermentation mass. The temperature of the slurry was approximately 90° C. to 100° C. The slurry was cooled to lower the temperature of the slurry to approximately 60° C. to 70° C.

Following cooling, a portion of the slurry of whole stillage (66.25 g dry weight) was introduced to a series of screens ranging from U.S. Sieve No. 35 (500 μm) to U.S. Sieve No. 500 (25 μm). The fraction passing through the U.S. Sieve No. 500 screen was filtered on 8 μm filter media. The fractions retained on each screen were removed from the screen by washing with a 100 ml aliquot of deionized water. Table 2 shows the compositional analysis of the materials retained on each screen. All weights are reported on a dry weight basis.

TABLE 2

| Fraction (U.S. Sieve No.) | Fraction dry wt. (g) | Fraction wt. % of Stillage sample | Carbohydrate wt. (g) | Carbohydrate wt. % | Lignin wt. (g) | Lignin wt. % | Inorganics wt. (g) | Inorganics wt. % |
|---|---|---|---|---|---|---|---|---|
| Whole stillage cake | 66.25 | — | 8.15 | 12.30 | 29.28 | 44.20 | 25.90 | 39.10 |
| +35 fraction | 5.70 | 10.48 | 2.88 | 50.50 | 1.62 | 28.34 | 1.23 | 21.53 |
| −35/+70 fraction | 2.18 | 4.01 | 0.43 | 19.78 | 0.88 | 40.32 | 0.65 | 29.76 |
| −70/+100 fraction | 1.35 | 2.48 | 0.14 | 10.16 | 0.39 | 29.09 | 0.70 | 51.80 |
| −100/+140 fraction | 6.10 | 11.21 | 0.64 | 10.55 | 2.38 | 39.05 | 2.42 | 39.75 |
| −140/+200 fraction | 7.17 | 13.18 | 0.81 | 11.24 | 2.98 | 41.63 | 2.60 | 36.20 |
| −200/+230 fraction | 4.12 | 8.11 | 0.37 | 9.02 | 1.59 | 38.66 | 1.67 | 40.62 |
| −230/+270 fraction | 3.53 | 6.49 | 0.36 | 10.14 | 1.69 | 47.99 | 1.08 | 30.51 |
| −270/+325 fraction | 0.56 | 1.03 | NA | NA | NA | NA | NA | NA |
| −325/+400 fraction | 1.14 | 2.10 | NA | NA | NA | NA | NA | NA |
| −400/+500 fraction | 5.10 | 9.38 | NA | NA | NA | NA | NA | NA |
| −500/+8 μm fraction | 7.28 | 13.38 | NA | NA | NA | NA | NA | NA |
| Total Solid in Filtrate | 9.38 | 17.25 | NA | NA | NA | NA | NA | NA |
| Total Recovered | 53.61 | | | | | | | |

NA: Not analyzed

The compositional analysis shows that a fraction enriched in carbohydrate is retained on and above the U.S. Sieve No. 70 screen and a fraction enriched in lignin is retained on screens below the U.S. Sieve No. 100 screen. The fraction retained on the U.S. Sieve No. 100 screen contains a relatively high amount of inorganics and could be made part of either the fraction enriched in carbohydrate or fraction enriched in lignin. Alternatively, the fraction could be removed as a fraction enriched in inorganics useful for formulation in drilling mud or concrete.

The results also indicate a 19 wt. % material loss during the screening process due to the relatively high number of screens used.

Example 3

This example demonstrates classification of corn stover whole stillage with a U.S. Sieve No. 100 screen.

A 300 g sample of corn stover whole stillage was obtained from the bottoms of a distillation column for the recovery of ethanol from a fermentation mass. Total solids content of the whole stillage sample was determined to be 36 g (12 wt. % solids).

The whole stillage sample was heated to approximately 70° C. with slow stirring. The heated slurry was then spread on a U.S. Sieve No. 100 screen fitted with a bottom pan. The materials on the screen were washed with approximately 100 ml of water (at approx. 70° C.). The materials on the screen were then dried in a vacuum oven at 80° C. The dry weight of the fraction retained on the screen was 1.17 g. The materials passing through the screen were filtered with 8 μm filter media and then washed with about 200 ml of water (at approx. 70° C.) to remove most soluble materials. The dry weight of the fraction retained on the 8 μm filter media was 24.81 g. Table 3 presents the compositional analysis of the fraction retained on the screen (+100 fraction) compared to washed whole stillage. The results indicate that the U.S. Sieve No. 100 screen was effective in producing a fraction enriched in carbohydrates.

TABLE 3

| Fraction (U.S. Sieve No.) | Fraction dry wt. (g) | Fraction wt. % of Stillage sample | Carbohydrate wt. % | Lignin wt. % | Inorganics wt. % |
|---|---|---|---|---|---|
| Washed whole stillage sample | 36.0 | — | 12.1 | 35.5 | 43.9 |
| +100 fraction | 1.17 | 3.25 | 30.4 | 30.5 | 25.0 |
| Total Solid in Filtrate | 9.59 | 26.64 | NA | NA | NA |
| Total Recovered | 35.57 | | | | |

NA: Not analyzed

The filtrate was poured into a glass beaker to observe any the settling out of insoluble materials not retained by the 8 μm filter media. After several hours, no signs of suspension were observed, which suggested that the filtrate contains primarily soluble materials. The filtrate was subsequently dried in vacuum oven at 45° C. The dry weight of the filtrate was calculated to be 9.59 g.

The material loss as a result of screening with one screen was 0.43 g or 1.2 wt. %.

Example 4

This example demonstrates a method for extraction of lignin and inorganics from a −100/+8 μm fraction of corn stover whole stillage.

A 10.07 g sample of the −100/+8 μm fraction obtained in Example 3 was reslurried with de-ionized water to approximately 5 wt. % solids in a 500 ml glass beaker. Then, 10% sodium hydroxide solution (approx. 13 ml) was added to the glass beaker to raise the pH of the slurry to about 12.5 to dissolve lignin. The slurry was then heated to about 90° C. with slow stirring. After about 10 minutes at that temperature, the slurry was allowed to cool while very slow stirring continued. When the temperature of the slurry reached 50° C., 72% sulfuric acid (approx. 0.45 ml) was added to the glass beaker to lower the pH of the slurry to about 10 to precipitate inorganics. Following addition of the 72% sulfuric acid, stirring was discontinued to allow precipitated inorganics to settle to the bottom of the beaker.

After settling of inorganics, the solution containing dissolved lignin was decanted from the inorganics into a second beaker. Water (approx. 200 ml at about 30° C.) was stirred into the second beaker. The residual precipitated inorganics were allowed to settle and the solution containing dissolved lignin was decanted from the residual inorganics into a third beaker. The precipitated inorganics in the second beaker were then combined with the contents of the first beaker to form an inorganic fraction, which can be further subjected to a solid-liquid separation or drying.

Subsequently, the solution containing dissolved lignin in the third beaker was heated to about 50° C. and stirred. Then, additional 72% sulfuric acid (approx. 2.5 ml) was added to the beaker to lower the pH of the solution to about 1.8 to precipitate lignin. The temperature of the solution was raised to about 80° C. and held for about 10 minutes before being allowed to cool down to about 30° C. The precipitated lignin was then separated from the solution with 8 μm filter media to produce the desired lignin fraction.

Table 4 below presents the compositional analysis of the inorganic fraction and lignin fraction obtained in this example. The results show that a fraction containing a relatively high concentration of inorganics and a fraction containing a relatively high concentration of lignin were produced.

TABLE 4

| Fraction | Fraction dry wt. (g) | Fraction wt. % of fraction sample | Carbohydrate wt. % | Lignin wt. % | Inorganics wt. % |
|---|---|---|---|---|---|
| Inorganic fraction | 3.49 | 34.7 | 2.1 | 2.6 | 91.5 |
| Lignin fraction | 5.6 | 55.6 | 6.5 | 62.3 | 19.9 |
| Total Recovered | 9.09 | | | | |

Example 5

In this example, the steps of Example 4 were repeated except that following the addition of 10% sodium hydroxide solution to raise the pH of the slurry to about 12.5 to dissolve lignin and inorganics, the slurry was then heated to about 70° C. instead of 90° C.

Table 5 below presents the compositional analysis of the inorganic fraction and lignin fraction obtained in this example. The results show that a fraction containing a relatively high concentration of inorganics and a fraction containing a relatively high concentration of lignin were produced.

TABLE 5

| Fraction | Fraction dry wt. (g) | Fraction wt. % of fraction sample | Carbohydrate wt. % | Lignin wt. % | Inorganics wt. % |
|---|---|---|---|---|---|
| Inorganic fraction | 3.78 | 37.8 | 4.7 | 3.5 | 86.9 |
| Lignin fraction | 4.74 | 47.4 | 7.7 | 64.7 | 13.3 |

Example 6

This example demonstrates classification of corn stover whole stillage with a U.S. Sieve No. 70 screen.

A 500 g sample of corn stover whole stillage was obtained from a distillation column for the recovery of ethanol from a fermentation mass. Total solids content of the whole stillage sample was determined to be 66.25 g (13.25 wt. % solids).

The whole stillage sample was heated to approximately 70° C. with slow stirring. The heated slurry was then spread on a U.S. Sieve No. 70 screen fitted with a bottom pan. The materials on the screen were washed with approximately 150 ml of with water (at approx. 70° C.). The materials on the screen were then dried in vacuum oven at 80° C. The dry weight of the fraction retained on the screen was 7.88 g. The materials passing through the screen were filtered with 8 μm filter media and then washed with about 300 ml of water (at approx. 70° C.) to remove most soluble materials. The dry weight of the fraction retained on the 8 μm filter media was 36.62 g. Table 5 presents the compositional analysis of the fraction retained on the screen (+70 fraction) and the fraction passing through the screen but retained on the 8 μm filter media (−70/+8 μm fraction). The results indicate that the U.S. Sieve No. 70 screen was effective in producing a fraction enriched in carbohydrates and a fraction enriched in lignin.

TABLE 6

| Fraction (U.S. Sieve No.) | Fraction dry wt. (g) | Fraction wt. % of Stillage sample | Carbohydrate wt. % | Lignin wt. % | Inorganics wt. % |
|---|---|---|---|---|---|
| Washed whole stillage sample | 66.25 | | 12.28 | 45.16 | 39.14 |
| +70 fraction | 7.88 | 11.89 | 28.23 | 38.98 | 22.68 |
| −70/+8 μm fraction | 36.62 | 55.28 | 7.76 | 44.77 | 37.74 |
| Total Solid in Filtrate | 10.16 | 15.34 | NA | NA | NA |
| Total Recovered | 54.66 | | | | |

NA: Not analyzed

The material loss as a result of screening with one screen was 11.59 g or 17.50 wt. %.

Example 7

This example demonstrates a method for extraction of lignin and inorganics from a −70/+8 μm fraction of corn stover whole stillage.

A 10.02 g sample of the −70/+8 μm fraction obtained in Example 6 was reslurried with de-ionized water to approximately 5 wt. % solids in a 500 ml glass beaker. Then, 10% sodium hydroxide solution (approx. 10.7 ml) was added to the glass beaker to raise the pH of the slurry to about 12.8 to dissolve lignin and inorganics. The slurry was then heated to about 90° C. with slow stirring. After about 10 minutes at that temperature, the slurry was allowed to cool while very slow stirring continued. When the temperature of the slurry reached 50° C., 96% sulfuric acid (approx. 0.3 ml) was added to the glass beaker to lower the pH of the slurry to about 10 to precipitate inorganics. Following addition of the 96% sulfuric acid, stirring was discontinued to allow precipitated inorganics to settle to the bottom of the beaker.

After settling of inorganics, the solution containing dissolved lignin was decanted from the inorganics into a second beaker. Water (approximately 200 ml at about 30° C.) was stirred in to the second beaker. The residual precipitated inorganics were allowed to settle and the solution containing dissolved lignin was decanted from the residual inorganics into a third beaker. The precipitated inorganics in the second beaker were then combined with the contents of the first beaker to form an inorganic fraction.

Subsequently, the solution containing dissolved lignin in the third beaker was heated to about 50° C. and stirred. Then, additional 96% sulfuric acid (approx. 1.8 ml) was added to the beaker to lower the pH of the solution to about 1.8 to precipitate lignin. The temperature of the solution was raised to about 80° C. and held for about 10 minutes before being allowed to cool down to about 30° C. The precipitated lignin was then separated from the solution with 8 μm filter media to produce the desired lignin fraction.

Table 7 below presents the compositional analysis of the inorganic fraction and lignin fraction obtained in this example. The results show that a fraction containing a relatively high concentration of inorganics and a fraction containing a relatively high concentration of lignin were produced.

TABLE 7

| Fraction | Fraction dry wt. (g) | Fraction wt. % of fraction sample | Carbohydrate wt. % | Lignin wt. % | Inorganics wt. % |
|---|---|---|---|---|---|
| −70/+8 μm fraction sample | 10.02 | — | 7.76 | 44.77 | 37.74 |
| Inorganic fraction | 6.19 | 61.8 | 5.43 | 10.66 | 77.02 |
| Lignin fraction | 3.01 | 30.0 | 2.73 | 78.93 | 8.98 |

When introducing elements of the present invention or the preferred embodiments(s) thereof, the articles "a", "an", "the" and "the" are intended to mean that there are one or more of the elements. The terms "comprising", "including", "containing" and "having" are intended to be inclusive and mean that there may be additional elements other than the listed elements.

In view of the above, it will be seen that the several objects of the invention are achieved and other advantageous results attained.

As various changes could be made in the above processes and compositions without departing from the scope of the invention, it is intended that all matter contained in the above description and shown in the accompanying drawings shall be interpreted as illustrative and not in a limiting sense. Having described the invention in detail, it will be apparent that modifications and variations are possible without departing from the scope of the invention defined in the appended claims.

What is claimed is:

1. A process for the recovery of values from a fermentation mass obtained in producing ethanol, the fermentation mass comprising ethanol and an aqueous medium having a solids component suspended therein, the process comprising:
   hydrolyzing biomass feedstock to produce treated biomass comprising fermentable sugars,
   fermenting the treated biomass to form the fermentation mass, and
   classifying the solids component of the fermentation mass to recover a solids fraction enriched in carbohydrates relative to the carbohydrate content of the solids component of the fermentation mass and a crude aqueous lignin slurry fraction comprising a solids component enriched in lignin relative to the lignin content of the solids fraction enriched in carbohydrates.

2. The process as set forth in claim 1 wherein prior to said classifying, at least a portion of the fermentation mass is subjected to distillation for recovery of ethanol, the solids component of the fermentation mass being retained in stillage from the distillation.

3. The process as set forth in claim 1 wherein the fermentation mass is obtained from a process for the production of ethanol from a biomass feedstock selected from the group consisting of corn stover, cereal straw, switchgrass, and mixtures thereof.

4. The process as set forth in claim 1 wherein the solids component of the fermentation mass is classified in a screen separation system comprising at least one screen.

5. The process as set forth in claim 1 wherein the particle size of the solids fraction enriched in carbohydrates is such that the fraction is retained on a screen having a mesh size of about U.S. Sieve No. 100 (150 μm) to about U.S. Sieve No. 70 (210 μm).

6. The process as set forth in claim 1 wherein the particle size of the solids component enriched in lignin of the crude aqueous lignin slurry fraction is such that the crude aqueous lignin slurry fraction passes through a screen having a mesh size of about U.S. Sieve No. 100 (150 μm) to about U.S. Sieve No. 70 (210 μm).

7. The process as set forth in claim 1, wherein the process further comprises:
   subjecting the crude aqueous lignin slurry fraction comprising a solids component enriched in lignin to a solid-liquid separation, thereby separating the solids component enriched in lignin from a liquid fraction.

8. The process as set forth in claim 1 wherein the solids component enriched in lignin comprises from about 30 wt. % to about 50 wt. % lignin and no greater than about 15 wt. % carbohydrates.

9. The process as set forth in claim 8 wherein the solids component enriched in lignin comprises from about 30 wt. % to about 55 wt. % inorganics.

10. The process as set forth in claim 1 wherein the process further comprises:
    contacting the solids component enriched in lignin with an alkali in an aqueous medium having a pH between about 11.5 and about 13 and dissolving lignin contained in the solids fraction in the aqueous medium, thereby producing an aqueous alkaline extract fraction comprising dissolved lignin.

11. The process as set forth in claim 10, wherein the aqueous alkaline extract fraction comprises dissolved lignin and dissolved inorganics, the process further comprising:
    reducing the pH of the aqueous alkaline extract fraction to between about 7 and about 11 and precipitating inorganic solids from the aqueous alkaline extract fraction, thereby producing a slurry comprising particulate inorganic solids and dissolved lignin.

12. The process as set forth in claim 11 wherein the process further comprises:
subjecting the slurry comprising particulate inorganic solids and dissolved lignin to a solid-liquid separation to separate the particulate inorganic solids from the slurry, thereby producing a mineral-rich particulate solids fraction comprising inorganic solids and a lignin-rich aqueous fraction comprising dissolved lignin.

13. The process as set forth in claim 12 wherein the process further comprises:
contacting the lignin-rich aqueous fraction comprising dissolved lignin with an acidifying agent in sufficient proportion to reduce the pH of the product fraction to a value at which the lignin precipitates, thereby producing a slurry comprising precipitated lignin.

14. The process as set forth in claim 13 wherein the process further comprises:
subjecting the slurry comprising precipitated lignin to a solid-liquid separation to separate the lignin from the slurry, thereby producing a lignin-rich solids product fraction and a residual liquids fraction comprising the acidifying agent.

15. The process as set forth in claim 14 wherein the lignin-rich solids product fraction comprises at least about 50% lignin on a dry weight basis, no greater than about 20% inorganics on a dry weight basis, and no greater than about 10% carbohydrates on a dry weight basis.

16. The process as set forth in claim 1 wherein the process further comprises:
contacting the crude aqueous lignin slurry fraction with a solvent, thereby producing an extract comprising dissolved lignin.

17. The process as set forth in claim 16 wherein the solvent comprises an organic solvent.

18. A process for extraction of lignin and inorganics from a lignin- and inorganics-containing mass, the process comprising:
contacting the mass with an alkali in an aqueous medium having a pH between about 11.5 and about 13 and dissolving lignin contained in the mass in the aqueous medium, thereby producing an aqueous alkaline extract fraction comprising dissolved lignin;
reducing the pH of the aqueous alkaline extract fraction comprising dissolved lignin to between about 7 and about 11 and precipitating inorganic solids from the aqueous alkaline extract fraction, thereby producing a slurry comprising particulate inorganic solids and dissolved lignin;
subjecting the slurry comprising particulate inorganic solids and dissolved lignin to a solid-liquid separation to separate the particulate inorganic solids, from the slurry, thereby producing a mineral-rich particulate solids fraction comprising inorganic solids and a lignin-rich aqueous fraction comprising dissolved lignin; and
contacting the lignin-rich aqueous fraction comprising dissolved lignin with an acidifying agent in sufficient proportion to reduce the pH of the aqueous fraction to a value at which the lignin precipitates, thereby producing a slurry comprising precipitated lignin.

19. The process as set forth in claim 18 wherein the lignin- and inorganics-containing mass is obtained from a process for the production of ethanol from a biomass feedstock selected from the group consisting of corn stover, cereal straw, and mixtures thereof.

\* \* \* \* \*